US012743299B2

(12) United States Patent
Fujimoto et al.

(10) Patent No.: US 12,743,299 B2
(45) Date of Patent: Sep. 22, 2026

(54) SERVER DELAY CONTROL DEVICE, SERVER DELAY CONTROL METHOD, AND PROGRAM

(71) Applicant: NTT, Inc., Tokyo (JP)

(72) Inventors: Kei Fujimoto, Musashino (JP); Masashi Kaneko, Musashino (JP)

(73) Assignee: NTT, Inc., Tokyo (JP)

(*) Notice: Subject to any disclaimer, the term of this patent is extended or adjusted under 35 U.S.C. 154(b) by 0 days.

(21) Appl. No.: 18/281,597

(22) PCT Filed: Mar. 18, 2021

(86) PCT No.: PCT/JP2021/011237
§ 371 (c)(1),
(2) Date: Sep. 12, 2023

(87) PCT Pub. No.: WO2022/195826
PCT Pub. Date: Sep. 22, 2022

(65) Prior Publication Data
US 2024/0160468 A1 May 16, 2024

(51) Int. Cl.
*H04L 43/0852* (2022.01)
*G06F 9/455* (2018.01)
(Continued)

(52) U.S. Cl.
CPC ........ *G06F 9/4812* (2013.01); *G06F 9/45558* (2013.01); *H04L 47/568* (2013.01); *G06F 2009/45595* (2013.01)

(58) Field of Classification Search
CPC ............... G06F 9/4812; G06F 9/45558; G06F 2009/45595; H04L 47/568
See application file for complete search history.

(56) References Cited

U.S. PATENT DOCUMENTS 6,415,332 B1 * 7/2002 Tuel, Jr. .................. G06F 9/546 718/100
12,498,964 B2 * 12/2025 Fujimoto .............. G06F 1/3296
(Continued)

FOREIGN PATENT DOCUMENTS

WO WO-2021130828 A1 * 7/2021 ........... H04L 43/103

OTHER PUBLICATIONS

Dpdk.org [online], "Developer Quick Start Guide Learn How to Get Involved With DPDK," available on or before Apr. 16, 2013, retrieved on Jan. 28, 2021, retrieved from URL<https://www.dpdk.org/>, 7 pages.

(Continued)

*Primary Examiner* — Vivek Srivastava
*Assistant Examiner* — Wuji Chen
(74) *Attorney, Agent, or Firm* — Fish & Richardson P.C.

(57) ABSTRACT

A server delay control device for performing packet transfer from an interface part of a computer is deployed in a kernel of an OS. The OS includes a ring buffer; and a poll list in which net device information is registered. The server delay control device includes: a packet arrival monitoring part configured to run in the kernel as a thread that monitors the poll list to monitor a packet arrival according to a polling model; a packet dequeuer configured to, when a packet has arrived, reference the packet held in the ring buffer, and perform dequeuing to remove a corresponding queue entry from the ring buffer; and a sleep management part configured to, when there is no packet arrival over a predetermined period of time, cause the thread to sleep and, when a packet arrives, cancel the sleep of the thread by a hardware interrupt handler.

17 Claims, 13 Drawing Sheets

(51) Int. Cl.
*G06F 9/48* (2006.01)
*H04L 47/56* (2022.01)

(56) References Cited

U.S. PATENT DOCUMENTS

2003/0037122 A1* 2/2003 Picca .................... H04L 51/18 709/219
2004/0003085 A1* 1/2004 Joseph ................ H04L 69/162 709/228
2004/0187112 A1* 9/2004 Potter, Jr. ............. G06F 9/4843 718/100
2005/0047439 A1* 3/2005 Madajczak ............ H04L 47/34 370/473
2005/0222933 A1* 10/2005 Wesby ................ H04W 12/08 705/36 R
2006/0153184 A1* 7/2006 Kounavis .............. H04L 47/50 370/389
2007/0124728 A1* 5/2007 Rosenbluth ............ G06F 9/526 718/100
2007/0140282 A1* 6/2007 Lakshmanamurthy .................... H04L 47/6255 370/412
2007/0143428 A1* 6/2007 Kumar ................ G06Q 10/107 709/206
2008/0005794 A1* 1/2008 Inoue .................... G06F 21/56 726/22
2008/0104296 A1* 5/2008 Blackmore .......... G06F 9/4843 718/107
2008/0107031 A1* 5/2008 Cnudde ............. H04N 21/6377 370/236
2008/0141358 A1* 6/2008 Lin ...................... H04L 67/104 726/12
2009/0138642 A1* 5/2009 Takahara ............. G06F 13/387 710/266
2010/0070717 A1* 3/2010 Arimilli .............. G06F 12/0862 710/22
2010/0162265 A1* 6/2010 Heddes .................. H04L 47/10 719/314
2010/0220641 A1* 9/2010 Son .................. H04W 52/0232 370/311
2012/0029901 A1* 2/2012 Nielsen .................. G06F 9/542 703/22
2012/0082167 A1* 4/2012 Musoll ................... H04L 45/00 370/389
2012/0291034 A1* 11/2012 Kamath ................... G06F 9/52 718/102
2013/0117775 A1* 5/2013 Perry ..................... H04W 4/06 725/14
2013/0204965 A1* 8/2013 Masputra ............... H04L 47/60 709/217
2014/0046638 A1* 2/2014 Peloski .............. G06F 16/2246 703/6
2014/0289234 A1* 9/2014 Johnson ............... H04W 64/00 707/723
2015/0049769 A1* 2/2015 Tamir ..................... H04L 47/56 370/412
2015/0099537 A1* 4/2015 Merithew ............ H04W 4/021 455/456.1
2015/0155041 A1* 6/2015 An ..................... G11C 11/5628 365/185.19
2015/0277997 A1* 10/2015 Pope ...................... H04L 69/28 719/318
2015/0331815 A1* 11/2015 Dai .................... G06F 13/1673 710/109
2016/0261526 A1* 9/2016 Kodama ................ H04L 45/38
2016/0275025 A1* 9/2016 Accapadi ............. G06F 9/4881
2016/0314030 A1* 10/2016 Wilson ................... G06F 9/546
2016/0379109 A1* 12/2016 Chung .................. G06N 3/063 706/26
2017/0206111 A1* 7/2017 Kannan .............. G06F 11/3452
2018/0331976 A1* 11/2018 Pope ...................... H04L 69/22
2018/0367460 A1* 12/2018 Gao ......................... G06F 9/50
2019/0075063 A1* 3/2019 Mcdonnell ............. H04L 49/70
2019/0102216 A1* 4/2019 Mathur .................. G06F 9/485
2019/0394142 A1* 12/2019 Zhang .................... H04L 47/70
2020/0089529 A1* 3/2020 Brownsword ....... G06N 3/0499
2020/0112500 A1* 4/2020 Wang ................. H04L 43/0817
2020/0348968 A1* 11/2020 Huchachar ............. G06F 9/445
2021/0075730 A1* 3/2021 Palermo ............. H04L 47/6275
2021/0097012 A1* 4/2021 Cai ........................ G06F 9/546
2022/0124588 A1* 4/2022 Zhu ....................... H04W 84/12
2022/0150171 A1* 5/2022 Matthews .............. H04L 47/56
2022/0166718 A1* 5/2022 Kamisetty .......... G06F 9/30036
2022/0326757 A1* 10/2022 Sydir ................ H04W 52/0216
2023/0029932 A1* 2/2023 Fujimoto ............. G06F 9/4812
2023/0185663 A1* 6/2023 Wang ................. G06F 11/1068 714/764
2023/0205713 A1* 6/2023 Jiang ...................... G06F 13/24 710/260
2023/0344780 A1* 10/2023 Kato ....................... H04L 43/10
2024/0129255 A1* 4/2024 Fujimoto ............. H04L 47/568
2024/0220254 A1* 7/2024 Mei ........................ G06F 9/522
2024/0275728 A1* 8/2024 Guo ....................... H04L 47/34
2024/0333541 A1* 10/2024 Fujimoto ............... H04L 12/12
2025/0328372 A1* 10/2025 Fujimoto ........... G06F 9/45558

OTHER PUBLICATIONS

Fujimoto et al., “KBP: Kernel Enhancements for Low-Latency Networking without Application Customization in Virtual Server,” 2021 IEEE 18th Annual Consumer Communications & Networking Conference (CCNC), Las Vegas, NV, USA, Jan. 9-12, 2021, 7 pages.
LWN.net [online], “New API,” Feb. 2002, retrieved on Mar. 5, 2021, retrieved from URL <http://lwn.net/2002/0321/a/napi-howto.php3>, 10 pages.
Ben-Yehuda et al., “Adding Advanced Storage Controller Functionality via Low-Overhead Virtualization,” In Proceedings of the 10th USENIX Conference on File and Storage Technologies, Feb. 14-17, 2012, San Jose, CA, 8 pages.
Shalev et al., “IsoStack—Highly Efficient Network Processing on Dedicated Cores,” In Proceedings of the 2010 USENIX Annual Technical Conference, Jun. 23-25, 2010, Boston, MA, 14 pages.

* cited by examiner

1000
PROTOCOL LAYER
NETWORKING LAYER
DEQUEUE PACKETS FROM RING BUFFER
DEVICE DRIVER
88
ip_rcv
89
arp_rcv
n
o
87
netif_receive_skb
m
120
PACKET DEQUEUER
q
110
PACKET ARRIVAL MONITORING PART
140
CPU FREQUENCY/CPU IDLE SETTING PART
130
SLEEP MANAGEMENT PART
100
POLLING THREAD
p
CANCEL SLEEP
g
POLL
k
186
poll_list
ℓ
72
RING BUFFER
182
netif_rx
f
81
hardIRQ
e
11
11a
NIC
HARDWARE FUNCTION PART
d
DMA

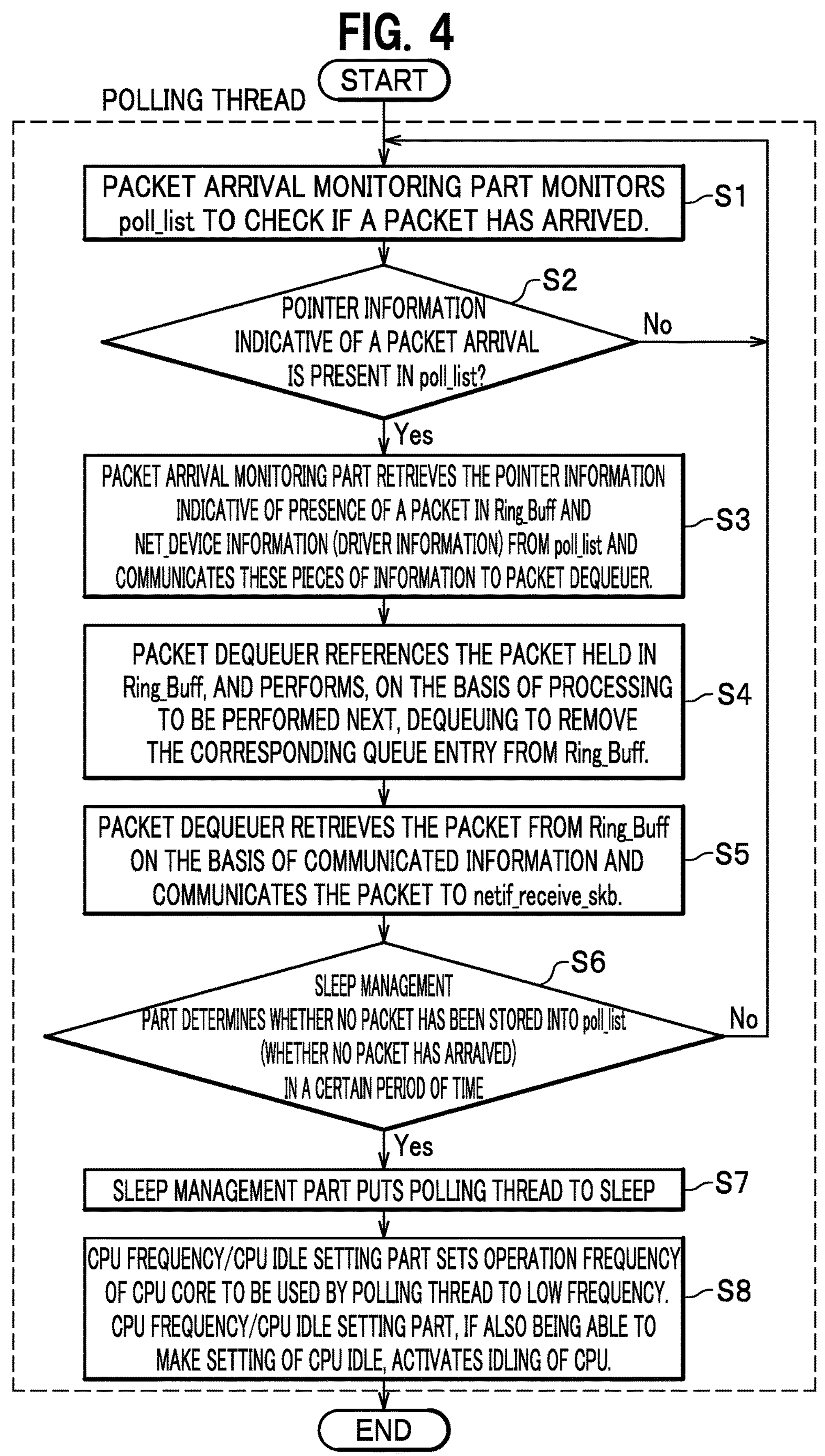
FIG. 4
START
POLLING THREAD
PACKET ARRIVAL MONITORING PART MONITORS poll_list TO CHECK IF A PACKET HAS ARRIVED.
S1
POINTER INFORMATION INDICATIVE OF A PACKET ARRIVAL IS PRESENT IN poll_list?
S2
No
Yes
PACKET ARRIVAL MONITORING PART RETRIEVES THE POINTER INFORMATION INDICATIVE OF PRESENCE OF A PACKET IN Ring_Buff AND NET_DEVICE INFORMATION (DRIVER INFORMATION) FROM poll_list AND COMMUNICATES THESE PIECES OF INFORMATION TO PACKET DEQUEUER.
S3
PACKET DEQUEUER REFERENCES THE PACKET HELD IN Ring_Buff, AND PERFORMS, ON THE BASIS OF PROCESSING TO BE PERFORMED NEXT, DEQUEUING TO REMOVE THE CORRESPONDING QUEUE ENTRY FROM Ring_Buff.
S4
PACKET DEQUEUER RETRIEVES THE PACKET FROM Ring_Buff ON THE BASIS OF COMMUNICATED INFORMATION AND COMMUNICATES THE PACKET TO netif_receive_skb.
S5
SLEEP MANAGEMENT PART DETERMINES WHETHER NO PACKET HAS BEEN STORED INTO poll_list (WHETHER NO PACKET HAS ARRAIVED) IN A CERTAIN PERIOD OF TIME
S6
No
Yes
SLEEP MANAGEMENT PART PUTS POLLING THREAD TO SLEEP
S7
CPU FREQUENCY/CPU IDLE SETTING PART SETS OPERATION FREQUENCY OF CPU CORE TO BE USED BY POLLING THREAD TO LOW FREQUENCY. CPU FREQUENCY/CPU IDLE SETTING PART, IF ALSO BEING ABLE TO MAKE SETTING OF CPU IDLE, ACTIVATES IDLING OF CPU.
S8
END

SERVER DELAY CONTROL DEVICE, SERVER DELAY CONTROL METHOD, AND PROGRAM

CROSS-REFERENCE TO RELATED APPLICATIONS

This is a National Stage Application of PCT Application No. PCT/JP2021/011237, filed on Mar. 18, 2021. The disclosure of the prior application is considered part of the disclosure of this application, and is incorporated in its entirety into this application.

BACKGROUND

Technical Field

The present invention relates to a server delay control device, a server delay control method, and a program.

Background Art

Against the background of advances in virtualization technology achieved through NFV (Network Functions Virtualization), systems are being constructed and operated on a per-service basis. Also, a mode called SFC (Service Function Chaining) is becoming mainstream, in which, based on the above-described mode of constructing a system on a per-service basis, service functions are divided into units of reusable modules and are operated on independent virtual machine (VM: Virtual Machine, container, etc.) environments, and thereby the service functions are used as needed in a manner as if they are components, and the operability is improved.

A hypervisor environment consisting of Linux (registered trademark) and a KVM (kernel-based virtual machine) is known as a technology for forming a virtual machine. In this environment, a Host OS (an OS installed on a physical server is called a "Host OS") in which a KVM module is incorporated operates as a hypervisor in a memory area called kernel space, which is different from user spaces. In this environment, the virtual machine operates in a user space, and a Guest OS (an OS installed on a virtual machine is called a Guest OS) operates in the virtual machine.

Unlike the physical server in which the Host OS operates, in the virtual machine in which the Guest OS operates, all hardware (HW) including network devices (such as Ethernet card devices) is controlled via registers, which is needed for interrupt processing from the HW to the Guest OS and for writing from the Guest OS to the hardware. In such register-based control, the performance is generally lower than that in the Host OS environment because the notifications and processing that would have been executed by physical hardware are emulated virtually by software.

To deal with this degraded performance, there is a technique of reducing HW emulation from a Guest OS, in particular, for a Host OS and an external process present outside of the virtual machine of the Guest OS, to improve performance and versatility of communication using a high-speed and consistent interface. As such a technique, a device abstraction technique called virtio, that is, a para-virtualization technique, has been developed and already been applied to many general-purpose OSes, such as FreeBSD (registered trade name) as well as Linux (registered trade name) and currently put into practical use.

In virtio, regarding data input/output such as console input/output, file input/output, and network communication, as a unidirectional data transfer transport, data exchange using a queue designed with a ring buffer are defined as queue operations. By using the virtio queue specifications and preparing queues whose number and sizes are suitable for each device when the Guest OS starts up, communication between the Guest OS and the outside of its virtual machine can be realized merely through operations on the queues without performing hardware emulation.

Packet Transfer in Interrupt Model (Example of General-Purpose VM Configuration)

FIG. 9 is an explanatory diagram illustrating packet transfer operations performed according to the interrupt model in a server virtualization environment which is configured with a general-purpose Linux kernel (registered trademark) and a VM.

HW 10 includes a network interface card (NIC) 11 (a physical NIC) (an interface part), and performs communication for data transmission and reception with a packet processing APL (Application) 1 in a user space 60 via a virtual communication channel constructed by a Host OS 20, a KVM 30, which is a hypervisor that constructs virtual machines, virtual machines (VM 1, VM 2) 40, and a Guest OS 50. In the following description, as indicated by the thick arrows in FIG. 9, the data flow in which packet processing APL 1 receives a packet from HW 10 is referred to as "Rx-side reception", and the data flow in which packet processing APL 1 transmits a packet to HW 10 is called "Tx-side transmission".

Host OS 20 includes a kernel 21, a Ring Buffer 22, and a Driver 23. Kernel 21 includes a vhost-net module 221, which is a kernel thread, a TAP device 222, and a virtual switch (br) 223.

TAP device 222 is a kernel device of a virtual network and is supported by software. Virtual machine (VM 1) 40 is configured such that Guest OS 50 and Host OS 20 can communicate via virtual switch (br) 223 created in a virtual bridge. TAP device 222 is a device connected to a Guest OS 50's virtual NIC (vNIC) created in this virtual bridge.

Host OS 20 copies the configuration information (sizes of shared buffer queues, number of queues, identifiers, information on start addresses for accessing the ring buffers, etc.) constructed in the virtual machine of Guest OS 50 to vhost-net module 221, and constructs, inside Host OS 20, information on the endpoint on the virtual machine side. This vhost-net module 221 is a kernel-level back end for virtio networking, and can reduce virtualization overhead by moving virtio packet processing tasks from the user area (user space) to vhost-net module 221 of kernel 21.

Guest OSes 50 include a Guest OS (Guest 1) installed on the virtual machine (VM 1) and a Guest OS (Guest 2) installed on the virtual machine (VM 2), and Guest OSes 50 (Guest 1, Guest 2) operate in virtual machines (VM 1, VM 2) 40. Taking Guest 1 as an example of Guest OSes 50, Guest OS 50 (Guest 1) includes a kernel 51, a Ring Buffer 52, and a Driver 53, and Driver 53 includes a virtio-driver 531.

Specifically, as PCI (Peripheral Component Interconnect) devices, there are respective virtio devices for console input/output, file input/output, and network communication in the virtual machine (the device for the console, which is called virtio-console, the device for file input/output, which is called virtio-blk, and the device for the network, which is called virtio-net, and their corresponding drivers included in the OS are each defined with a virtio queue). When Guest OS starts up, two data transfer endpoints (transmission/reception endpoints) for each device are created between Guest OS and the counterpart side, and a parent-child relationship for data transmission and reception is constructed. In many cases, the parent-child relationship is formed between the virtual machine side (child side) and the Guest OS (parent side).

The child side exists as configuration information of each device in the virtual machine, and requests the size of each data area, the number of combinations of needed endpoints, and the type of the device to the parent side. In accordance with the request from the child side, the parent side allocates and maintains memory for a shared buffer queue for accumulating and transferring the needed amount of data, and sends the address of the memory as a response to the child side so that the child side can access it. Operations of the shared buffer queue necessary for data transfer are uniformly defined in virtio, and are performed in a state where both the parent side and the child side have agreed on the definition. Furthermore, the size of the shared buffer queue also has been agreed on by both sides (i.e., it is determined for each device). As a result, it is possible to operate the queue shared by both the parent side and the child side by merely communicating the address to the child side.

As each shared buffer queue prepared in virtio is prepared for one direction, for example, a virtual network device called a virtio-net device is constituted by three Ring Buffers 52 for transmission, reception, and control. Communication between the parent and the child is realized by writing to the shared buffer queue and performing a buffer update notification. That is, after writing to the Ring Buffer 52, a notification is made to the counterpart. Upon receipt of the notification, the counterpart side uses common operations of virtio to check which shared buffer queue contains the new data and check how much the new data is, and retrieves a new buffer area. As a result, transfer of data from the parent to the child or from the child to the parent is achieved.

As described above, by sharing Ring Buffer 52 for mutual data exchange and the operation method (used in common in virtio) for each ring buffer between the parent and the child, communication between Guest OS 50 and the outside, which does not require hardware emulation, is realized. This makes it possible to realize transmission and reception of data between Guest OS 50 and the outside at a high speed compared to the conventional hardware emulations.

If Guest OS 50 in the virtual machine communicates with the outside, the child side needs to connect to the outside and transmit and receive data as a relay between the outside and the parent side. For example, communication between Guest OS 50 and Host OS 20 is one example. Here, if the outside is Host OS 20, two patterns are present as existing communication methods.

In the first method (hereinafter referred to as "external communication method 1"), a child-side endpoint is constructed in the virtual machine, and a communication between Guest OS 50 and Host OS 20 is connected in the virtual machine to a communication endpoint (usually called a "TAP/TUN device") provided by Host OS 20. This connection constructs a connection as follows and thus realizes communication from Guest OS 50 to Host OS 20.

In this case, Guest OS 50 operates in a memory area that is a user space having privileges different from a memory area called kernel space, in which the TAP driver and Host OS 20 operate. For this reason, at least one memory copy occurs in the communication from Guest OS 50 to Host OS 20.

In the second method (hereinafter referred to as "external communication method 2"), a technology called vhost-net exists as means for solving this. According to the vhost-net, parent-side configuration information (sizes of shared buffer queues, number of queues, identifiers, information on start addresses for accessing ring buffers, etc.) once constructed in the virtual machine is copied into the vhost-net module 221 inside the Host OS 20, and information on the endpoints of the child side is constructed inside the host. Vhost-net is a technology that enables operations on shared buffer queues to be carried out directly between Guest OS 50 and Host OS 20 by this construction. As a result, the number of copy operations is substantially zero, and data transfer can be realized at a higher speed than the external communication method 1 because the number of copy operations is less by one compared to virtio-net.

In this manner, in the case of Host OS 20 and Guest OS 50 connected by virtio, packet transfer processing can be sped up by reducing the number of virtio-net related memory copy operations.

Note that in kernel v4.10 (February 2017-) and later, the specifications of the TAP interface have changed, and packets inserted from the TAP device are completed in the same context as the processing of copying packets to the TAP device. Accordingly, software interrupts (softIRQ) no longer occur.

Packet Transfer in Polling Model (Example of DPDK)

The method of connecting and coordinating virtual machines is called Inter-VM Communication, and in large-scale environments such as data centers, virtual switches have been typically used in connections between VMs. However, since it is a method with a large communication delay, faster methods have been newly proposed. For example, a method of using special hardware called SR-IOV (Single Root I/O Virtualization), a method performed with software using Intel DPDK (Intel Data Plane Development Kit) (hereinafter referred to as DPDK), which is a high-speed packet processing library, and the like have been proposed (see Non Patent Literature 1).

DPDK is a framework for controlling an NIC (Network Interface Card), which was conventionally controlled by a Linux kernel (registered trademark), in a user space. The biggest difference from the processing in the Linux kernel is that it has a polling-based reception mechanism called PMD (Pull Mode Driver). Normally, with a Linux kernel, an interrupt occurs upon arrival of data on the NIC, and this interrupt triggers the execution of reception processing. On the other hand, in a PMD, a dedicated thread continuously checks arrival of data and performs reception processing. High-speed packet processing can be performed by eliminating the overhead of context switching, interrupts, and the like. DPDK significantly increases packet processing performance and throughput, making it possible to ensure more time for processing of data plane applications.

DPDK exclusively uses computer resources such as a CPU (Central Processing Unit) and an NIC. For this reason, it is difficult to apply it to an application, such as SFC, that flexibly reconnects in units of modules. There is SPP (Soft Patch Panel), which is an application for mitigating this. SPP omits packet copy operations in the virtualization layer by adopting a configuration in which shared memory is prepared between VMs and each VM can directly reference the same memory space. Also, DPDK is used to speed up exchanging packets between a physical NIC and the shared memory. In SPP, the input destination and output destination of a packet can be changed by software by controlling the reference destination for the memory exchange by each VM. Through this process, SPP realizes dynamic connection switching between VMs, and between a VM and a physical NIC.

FIG. 10 is an explanatory diagram illustrating packet transfer performed based on a polling model in an OvS-DPDK (Open vSwitch with DPDK) configuration. The same components as those in FIG. 9 are denoted by the same reference signs thereas, and descriptions of overlapping portions are omitted.

As illustrated in FIG. 10, a Host OS 20 includes an OvS-DPDK 70, which is software for packet processing; and OvS-DPDK 70 includes a vhost-user 71, which is a functional part for connecting to a virtual machine (here, VM 1), and a dpdk (PMD) 72, which is a functional part for connecting to an NIC (DPDK) 11 (physical NIC).

Moreover, a packet processing APL 1A includes a dpdk (PMD) 2, which is a functional part that performs polling in the Guest OS 50 section. That is, packet processing APL 1A is an APL obtained by modifying packet processing APL 1 illustrated in FIG. 9 by equipping packet processing APL 1 with dpdk (PMD) 2.

As an extension of DPDK, packet transfer performed based on the polling model enables a routing operation using a GUI in an SPP that rapidly performs packet copy operations between Host OS 20 and Guest OS 50 and between Guest OSes 50 via shared memory with zero-copy operation.

Rx-Side Packet Processing by New API (NAPI)

FIG. 11 is a schematic diagram of Rx-side packet processing by New API (NAPI) implemented in Linux kernel 2.5/2.6 and later versions (see Non Patent Literature 2). The same components as those in FIG. 9 are denoted by the same reference signs thereas.

As illustrated in FIG. 11, New API (NAPI) executes, on a server including an OS 70 (e.g., a Host OS), a packet processing APL 1 deployed in a user space 60, which can be used by a user, and performs packet transfer between an NIC 11 of HW 10, connected to the OS 70, and packet processing APL 1.

OS 70 has a kernel 71, a ring buffer 72, and a driver 73, and kernel 71 has a protocol processor 74.

Kernel 71 has the function of the core part of OS 70 (e.g., Host OS). Kernel 71 monitors hardware and manages execution status of programs, on a per-process basis. Here, kernel 71 responds to requests from packet processing APL 1 and conveys requests from HW 10 to packet processing APL 1. In response to a request from packet processing APL 1, kernel 71 performs processing via a system call (a “user program operating in a non-privileged mode” requests processing to a “kernel operating in a privileged mode”).

Kernel 71 transmits packets to packet processing APL 1 via a Socket 75. Kernel 71 receives packets from packet processing APL 1 via socket 75.

Ring buffer 72 is managed by kernel 71 and is in the memory space in the server. Ring buffer 72 is a constant-sized buffer that stores messages output by kernel 71 as logs, and is overwritten from the beginning when the messages exceed a maximum size.

Driver 73 is a device driver for monitoring hardware in kernel 71. Incidentally, driver 73 depends on kernel 71, and is replaced if the source code of the created (built) kernel is modified. In this case, a corresponding driver source code is to be obtained and rebuilding is to be performed on the OS that will use the driver, to create the driver.

Protocol processor 74 performs protocol processing of L2 (data link layer)/L3 (network layer)/L4 (transport layer), which are defined by the OSI (Open Systems Interconnection) reference model.

Socket 75 is an interface for kernel 71 to perform inter-process communication. Socket 75 has a socket buffer and does not frequently cause a data copying process. The flow up to the establishment of communication via Socket 75 is as follows. 1. The server side creates a socket file according to which the server side accepts clients. 2. Name the acceptance socket file. 3. Create a socket queue. 4. Accept a first connection from a client that is in the socket queue. 5. The client side creates a socket file. 6. The client side sends a connection request to the server. 7. The server side creates a connection socket file separately from the acceptance socket file. As a result of establishing communication, packet processing APL 1 becomes able to call a system call, such as read( ) and write( ), to kernel 71.

In the above configuration, kernel 71 receives a notification of a packet arrival from NIC 11 via a hardware interrupt (hardIRQ) and schedules a software interrupt (softIRQ) for packet processing.

Above-described New API (NAPI), implemented in Linux kernel 2.5/2.6 and later versions, processes, upon arrival of a packet, the packet by a software interrupt (softIRQ) after the hardware interrupt (hardIRQ). As illustrated in FIG. 11, in packet transfer based on the interrupt model, a packet is transferred through interrupt processing (see reference sign c in FIG. 11), and therefore a wait due to the interrupt processing occurs and the delay in packet transfer increases.

An overview of Rx-side packet processing of NAPI will be described below. Configuration of Rx-Side Packet Processing by New API (NAPI)

FIG. 12 is an explanatory diagram for explaining an overview of Rx-side packet processing by New API (NAPI) at the part surrounded by the dashed line in FIG. 11.

Device Driver

As illustrated in FIG. 12, components deployed in the device driver include; NIC 11, which is a network interface card (physical NIC); hardIRQ 81, which is a handler called due to the generation of a processing request from NIC 11 to perform the requested processing (hardware interrupt); and netif_rx 82, which is a processing function part for the hardware interrupt.

Networking Layer

The components deployed in the networking layer include: softIRQ 83, which is a handler called due to the generation of a processing request from netif_rx 82 to perform the requested processing (software interrupt); and do_softirq 84, which is a control function part that performs the actual part of the software interrupt (softIRQ). The components deployed in the networking layer further include: net_rx_action 85, which is a packet processing function part that is executed upon reception of the software interrupt (softIRQ); a poll_list 86, in which information on a net device (net_device), indicative of which device the hardware interrupt from NIC 11 comes from, is registered; netif_receive_skb 87, which creates a sk_buff structure (structure for enabling the kernel 71 to know the structure of the packet); and a ring buffer 72.

Protocol Layer

The components deployed in the protocol layer include: ip_rcv 88, arp_rcv 89, and the like, which are packet processing function parts.

The above-described netif_rx 82, do_softirq 84, net_rx_action 85, netif_receive_skb 87, ip_rcv 88, and arp_rcv 89 are program components (function names) used for packet processing in kernel 71.

Rx-Side Packet Processing Operation by New API (NAPI)

The arrows (reference signs) d to o in FIG. 12 indicate the flow of the Rx-side packet processing.

A hardware function part 11*a* of NIC 11 (hereinafter referred to as "NIC 11") is configured to, upon reception of a packet in a frame (or upon reception of a frame) from a remote device, copy the arrived packet to ring buffer 72 by a Direct Memory Access (DMA) transfer (see reference sign d in FIG. 12), without using the CPU. Ring buffer 72 is managed by kernel 71 in a memory space in the server (see FIG. 11).

However, kernel 71 cannot notice the arrived packet simply by NIC 11 copying the arrived packet to ring buffer 72. In view of this, when the packet arrives, NIC 11 raises a hardware interrupt (hardIRQ) to hardIRQ 81 (see reference sign e in FIG. 12) and netif_rx 82 performs the processing described below, which causes kernel 71 to notice the packet. Incidentally, the notation of an ellipse surrounding hardIRQ 81, illustrated in FIG. 12, represents a handler rather than a functional part.

netif_rx 82 has a function of performing actual processing. When hardIRQ 81 (handler) has started execution (see reference sign fin FIG. 12), netif_rx 82 stores, into poll_list 86, information on a net device (net_device), which is one piece of information of the content of the hardware interrupt (hardIRQ) and which indicates which device the hardware interrupt from NIC 11 comes from, and registers, in poll_list 86, a dequeuing operation (referencing the content of a packet pooled in a buffer and, processing to be performed on the packet, taking into account the processing to be performed next, removing the corresponding queue entry from the buffer) (see reference sign g in FIG. 12). Specifically, netif_rx 82, in response to the packet having been loaded into ring buffer 72, registers a dequeuing operation in poll_list 86 using a driver of NIC 11 (see reference sign g in FIG. 12). As a result, information on the dequeuing operation due to the packet having been loaded into ring buffer 72 is registered into poll_list 86.

In this way, in the device driver illustrated in FIG. 12, upon reception of a packet, NIC 11 copies the arrived packet to ring buffer 72 by a DMA transfer. In addition, NIC 11 raises hardIRQ 81 (handler), and netif_rx 82 registers net_device in poll_list 86 and schedules a software interrupt (softIRQ).

With the above-described processing, the hardware interrupt processing in device driver illustrated in FIG. 12 ends.

netif_rx 82 passes up, to softIRQ 83 (handler) via a software interrupt (softIRQ) (see reference sign h in FIG. 12), a request for dequeuing data stored in ring buffer 72 using information (specifically, a pointer) enqueued in the queue stacked in poll_list 86, thereby to communicate the request to notify do_softirq 84, which is a software interrupt control function part (see reference sign i in FIG. 12).

do_softirq 84 is a software interrupt control function part that defines functions of the software interrupt (there are various types of packet processing; the interrupt processing is one of them; it defines the interrupt processing). Based on the definition, do_softirq 84 notifies net_rx_action 85, which performs actual software interrupt processing, of a request for processing the current (corresponding) software interrupt (see reference sign j in FIG. 12).

When the order of the softIRQ comes, net_rx_action 85 calls, according to net_device registered in poll_list 86 (see reference sign k in FIG. 12), a polling routine configured to dequeue a packet from ring buffer 72, to dequeue the packet (see reference sign l in FIG. 12). At this time, net_rx_action 85 continues the dequeuing until poll_list 86 becomes empty.

Thereafter, net_rx_action 85 notifies netif_receive_skb 87 (see reference sign m in FIG. 12).

netif_receive_skb 87 creates a sk_buff structure, analyzes the content of the packet, and assigns processing to the protocol processor 74 arranged in the subsequent stage (see FIG. 11) in a manner depending on the type. That is, netif_receive_skb 87 analyzes the content of the packet and, when processing is to be performed according to the content of the packet, assigns (see reference sign n in FIG. 12) the processing to ip_rcv 88 of the protocol layer, and, for example, in the case of L2, assigns processing to arp_rcv 89 (see reference sign o in FIG. 12).

Non Patent Literature 3 describes a server network delay control device (KBP: Kernel Busy Poll). KBP constantly monitors packet arrivals according to a polling model in a kernel. With this, softIRQ is refrained, and low-delay packet processing is achieved.

CITATION LIST

Non Patent Literature

Non Patent Literature 1: "Developer Quick Start Guide Learn How To Get Involved With DPDK," Intel, [online], [retrieved on Mar. 5, 2021], Internet <URL: https://www.dpdk.org/>

Non Patent Literature 2: New API (NAPI), [online], [retrieved on Mar. 5, 2021], Internet <URL: http://http://lwn.net/2002/0321/a/napi-howto.php3>

Non Patent Literature 3: Kei Fujimoto, Kenichi Matsui, Masayuki Akutsu, "KBP: Kernel Enhancements for Low-Latency Networking without Application Customization in Virtual Server", IEEE CCNC 2021.

SUMMARY OF THE INVENTION

Technical Problem

However, the packet transfer based on the interrupt model and the packet transfer based on the polling model have the following problems.

In the interrupt model, the kernel that receives an event (hardware interrupt) from the HW performs packet transfer through software interrupt processing for performing packet processing. As the interrupt model transfers packets through an interrupt (software interrupt) processing, there is a problem in that when a contention with other interrupts occurs and/or when the interrupt destination CPU is in use by a process with a higher priority, a wait occurs, and thus the delay in packet transfer increases. In this case, if the interrupt processing is congested, the wait delay further increases.

For example, as illustrated in FIG. 9, in packet transfer based on the interrupt model, a packet is transferred through interrupt processing (see reference signs a and b in FIG. 9), and therefore a wait due to the interrupt processing occurs and the delay in packet transfer increases.

A supplemental description will be given of the mechanism by which a delay occurs in the interrupt model.

In a general kernel, in packet transfer processing, packet transfer processing is performed in software interrupt processing after hardware interrupt processing.

When a software interrupt for packet transfer processing occurs, the software interrupt processing cannot be executed immediately under the conditions (1) to (3) described below. Thus, a wait in the order of milliseconds occurs due to the interrupt processing being mediated and scheduled by a scheduler such as ksoftirqd (a kernel thread for each CPU; executed when the load of the software interrupt becomes high).

(1) When there is a contention with other hardware interrupt processing (2) When there is a contention with other software interrupt processing (3) When the interrupt destination CPU is in use by another process or a kernel thread (migration thread, etc.), which has a higher priority.

Under the above conditions, the software interrupt processing cannot be executed immediately.

In addition, a NW delay in the order of milliseconds also occurs in the same manner in the packet processing by New API (NAPI) due to a contention with an interrupt processing (softIRQ), as indicated in the dashed box p in FIG. 12.

On the other hand, the polling model performs polling on a communication queue while occupying the CPU, and dequeues packets immediately at the arrivals of the packets. Although the polling model can reduce the transfer delay, it is necessary to equip the APL with a polling function, and therefore the APL needs to be modified.

For example, as illustrated in FIG. 10, in packet transfer based on the polling model, it is necessary to equip packet processing APL 1 with dpdk (PMD) 72, which is a functional part for performing polling, in the Guest OS 50 section. Thus, it is necessary to modify the packet processing APL 1.

Moreover, KBP described in Non Patent Literature 3 can refrain softIRQ by constantly monitoring packet arrivals according to a polling model in the kernel, and thus, low-delay packet processing can be achieved.

However, as the kernel thread that constantly monitors packet arrivals occupies a CPU core and uses the CPU time all the time, there is a problem in that the power consumption increases. Referring now to FIGS. 13 and 14, a description will be given of a relationship between workload and the CPU usage rate.

FIG. 13 illustrates an example of a transfer of video image data (30 FPS). The workload illustrated in FIG. 13 is to intermittently perform data transfer every 30 ms at a transfer rate of 350 Mbps.

FIG. 14 is a graph illustrating the CPU usage rate that is used by a busy-poll thread of KBP described in Non Patent Literature 3.

As illustrated in FIG. 14, in the case of KBP, the kernel thread occupies a CPU core to perform busy polling. Even in the intermittent packet reception illustrated in FIG. 13, the CPU is used all the time in the case of KBP, regardless of whether a packet has arrived. Therefore, there is a problem in that the power consumption increases.

The present invention has been made in view of such a background, and the present invention aims to perform packet transfer with a reduced delay in a server while reducing the power consumption, without modifying an APL.

Means for Solving the Problem

To solve the above problem, provided is a server delay control device, wherein an OS comprises: a kernel; a ring buffer managed by the kernel, in a memory space in which a server deploys the OS; and a poll list in which information on a net device is registered, the information on the net device being indicative of which device a hardware interrupt from an interface part comes from, wherein the kernel comprises the server delay control device, which is configured to spawn a thread configured to monitor a packet arrival according to a polling model, and wherein the server delay control device comprises: a packet arrival monitoring part configured to monitor the poll list; a packet dequeuer configured to, when a packet has arrived, reference the packet held in the ring buffer, and perform, on the basis of the processing to be performed next, dequeuing to remove a corresponding queue entry from the ring buffer; and a sleep management part configured to, when there is no packet arrival over a predetermined period of time, cause a thread to sleep and, when a packet arrives, cancel the sleep of the thread by a hardware interrupt.

Advantageous Effects of the Invention

According to the present invention, it is possible to perform packet transfer with a reduced delay in a server without modifying an APL, while reducing the power consumption.

BRIEF DESCRIPTION OF DRAWINGS

FIG. 4 is a flowchart illustrating an Rx-side operation and management processing for power saving in a server delay control device of the server delay control system according to the embodiment of the present invention.

DESCRIPTION OF EMBODIMENTS

Hereinafter, a server delay control system and the like in a mode for carrying out the present invention (hereinafter, referred to as "the present embodiment") will be described with reference to the drawings.

Overview

Figure 1:
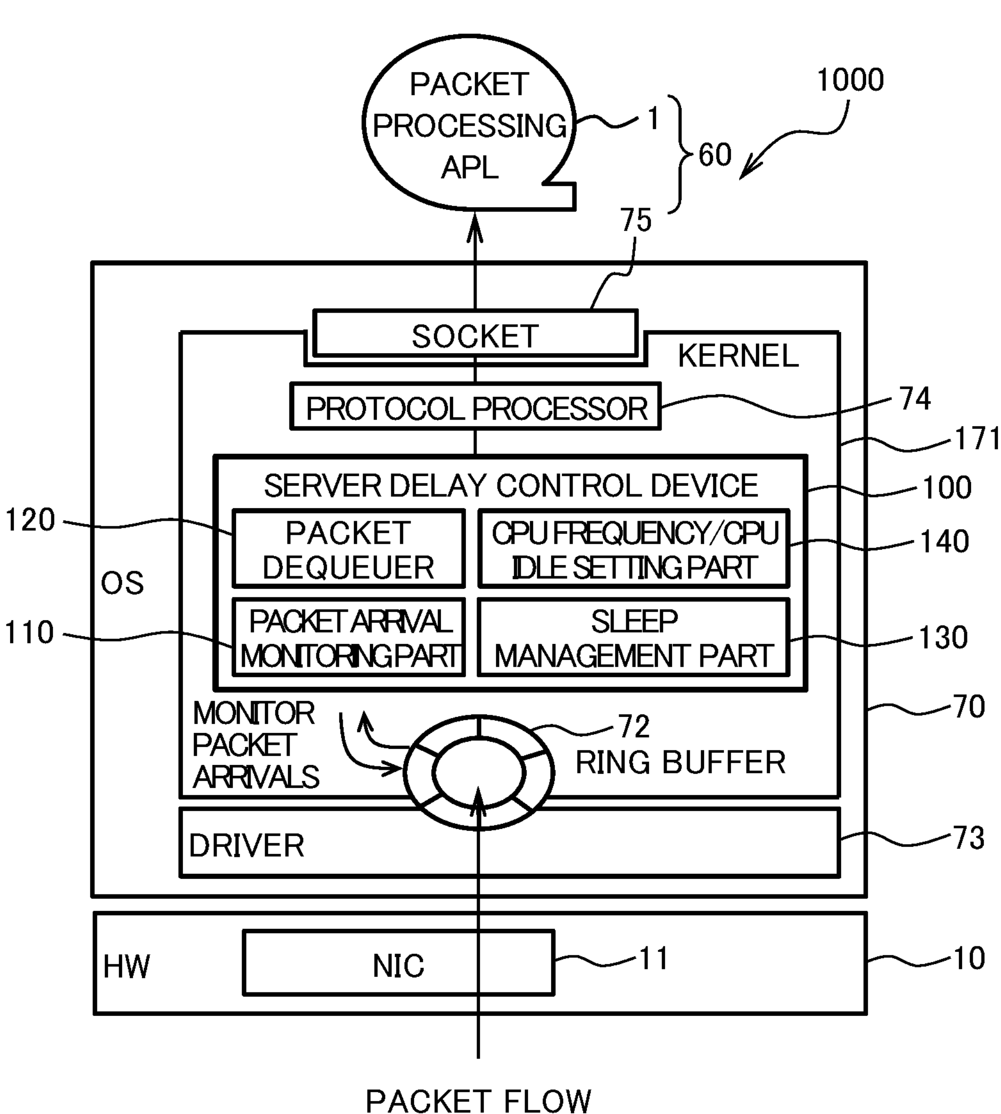
FIG. 1 is a schematic configuration diagram of a server delay control system according to an embodiment of the present invention.

FIG. 1 is a schematic configuration diagram of a server delay control system according to an embodiment of the present invention. The present embodiment is an example applied to Rx-side packet processing by New API (NAPI) implemented in Linux kernel 2.5/2.6 and later versions. The same components as those in FIG. 11 are denoted by the same reference signs as those in FIG. 11.

As illustrated in FIG. 1, the server delay control system 1000 executes, on a server including an OS 70 (e.g., a host OS), a packet processing APL 1 deployed in a user space 60 usable by a user and performs packet transfer between an NIC 11 of a HW 10 connected to the OS 70 and the packet processing APL 1.

OS 70 has a kernel 171, a ring buffer 72, and a driver 73. Kernel 171 has a server delay control device 100, and a protocol processor 74.

Figure 11:
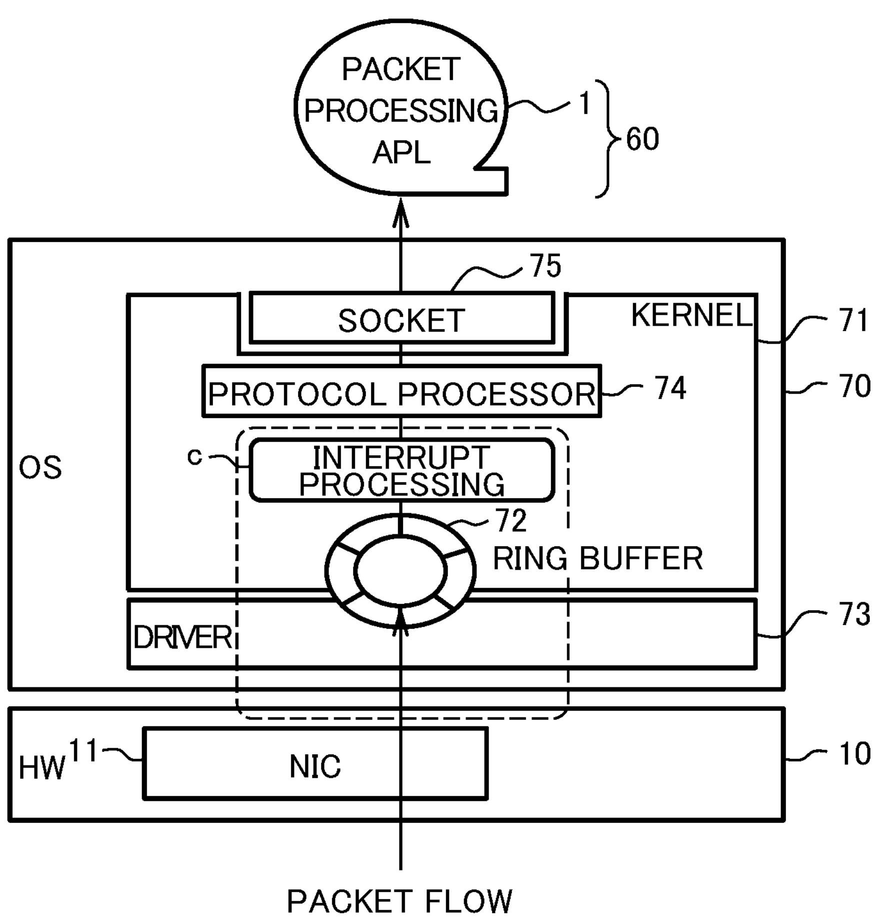
FIG. 11 is a schematic diagram of Rx-side packet processing by New API (NAPI) implemented in Linux kernel 2.5/2.6 and later versions.

In the present embodiment, kernel 171 is given a new reference numeral to be distinguished from kernel 71 illustrated in FIG. 11, because the former includes server delay control device 100. Kernel 171 has the same function as kernel 71 illustrated in FIG. 11, except that server delay control device 100 is installed in kernel 171. Note that kernel 171 may be embodied without reconstructing (newly building) existing kernel 71 (see FIG. 11), by using Livepatch (described below).

Kernel 171 has the function of the core portion of OS 70 (e.g., a Host OS) and monitors hardware and manages program execution status, on a per-process basis. Here, kernel 171 responds to requests from packet processing APL 1 and communicates requests from HW 10 to packet processing APL 1. Kernel 171 processes requests from packet processing APL 1 via system calls.

Kernel 171 transmits packets to packet processing APL 1 via a socket 75. Kernel 71 receives packets from packet processing APL 1 via socket 75.

Kernel 171 manages the ring buffer 72, in a memory space in the server. Ring buffer 72 is a constant-sized buffer that stores messages output by kernel 171 as logs, and is overwritten from the beginning when the messages exceed a maximum size.

Driver 73 is a device driver for monitoring hardware in kernel 171.

Protocol processor 74 performs protocol processing of L2/L3/L4 defined by the OSI reference model.

Socket 75 is an interface for kernel 171 to perform inter-process communication. Socket 75 has a socket buffer and does not frequently cause a data copying process.

Server Delay Control Device

Server delay control device 100 includes a packet arrival monitoring part 110, a packet dequeuer 120, a sleep management part 130, and a CPU frequency/CPU idle setting part 140 (a CPU frequency setting part and a CPU idle setting part).

Packet arrival monitoring part 110 is a thread for monitoring whether a packet has arrived. Packet arrival monitoring part 110 monitors (polls) poll_list 186 (see FIG. 2).

Packet arrival monitoring part 110 retrieves pointer information indicative of the presence of a packet in ring buffer 72 (see FIG. 2) and net device information from poll list 186 and communicates the information (pointer information and net device information) to packet dequeuer 120. Here, if multiple pieces of packet information are present in the poll_list 186, information as many as the multiple pieces is communicated.

When a packet has arrived, packet dequeuer 120 references the packet held in ring buffer 72, and performs, on the basis of the processing to be performed next, dequeuing to remove the corresponding queue entry from ring buffer 72 (hereinafter, description regarding the dequeuing is sometimes abbreviated as "dequeuing the packet from ring buffer 72" and the like). Packet dequeuer 120 retrieves the packet from ring buffer 72 on the basis of the communicated information and transmits the packet to netif_receive_skb 87.

Sleep management part 130 makes the thread (polling thread) sleep in cases where no packet has arrived during a predetermined period of time, and when a packet arrives, cancels the sleep with a hardware interrupt (hardIRQ) of the thread (polling thread) (described later in detail).

In the sleep, CPU frequency/CPU idle setting part 140 sets the CPU operation frequency of the CPU core used by the thread (polling thread) to a low frequency. In the sleep, CPU frequency/CPU idle setting part 140 sets the CPU idle state of the CPU core used by this thread (polling thread) to a power-saving mode (described later in detail).

Figure 2:
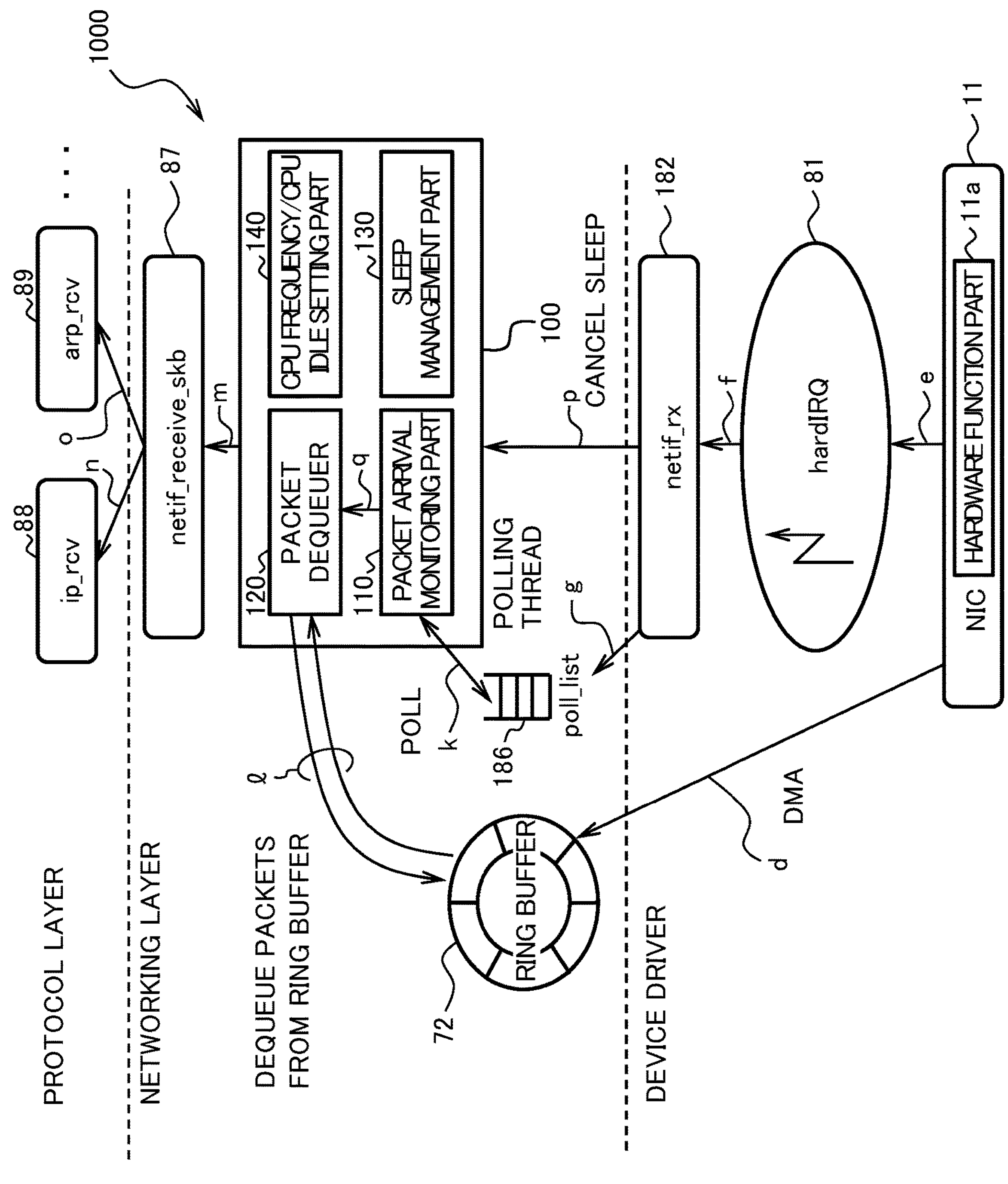
FIG. 2 is an explanatory diagram illustrating details of Rx-side packet processing by New API (NAPI) of the server delay control system according to the embodiment of the present invention.
Figure 12:
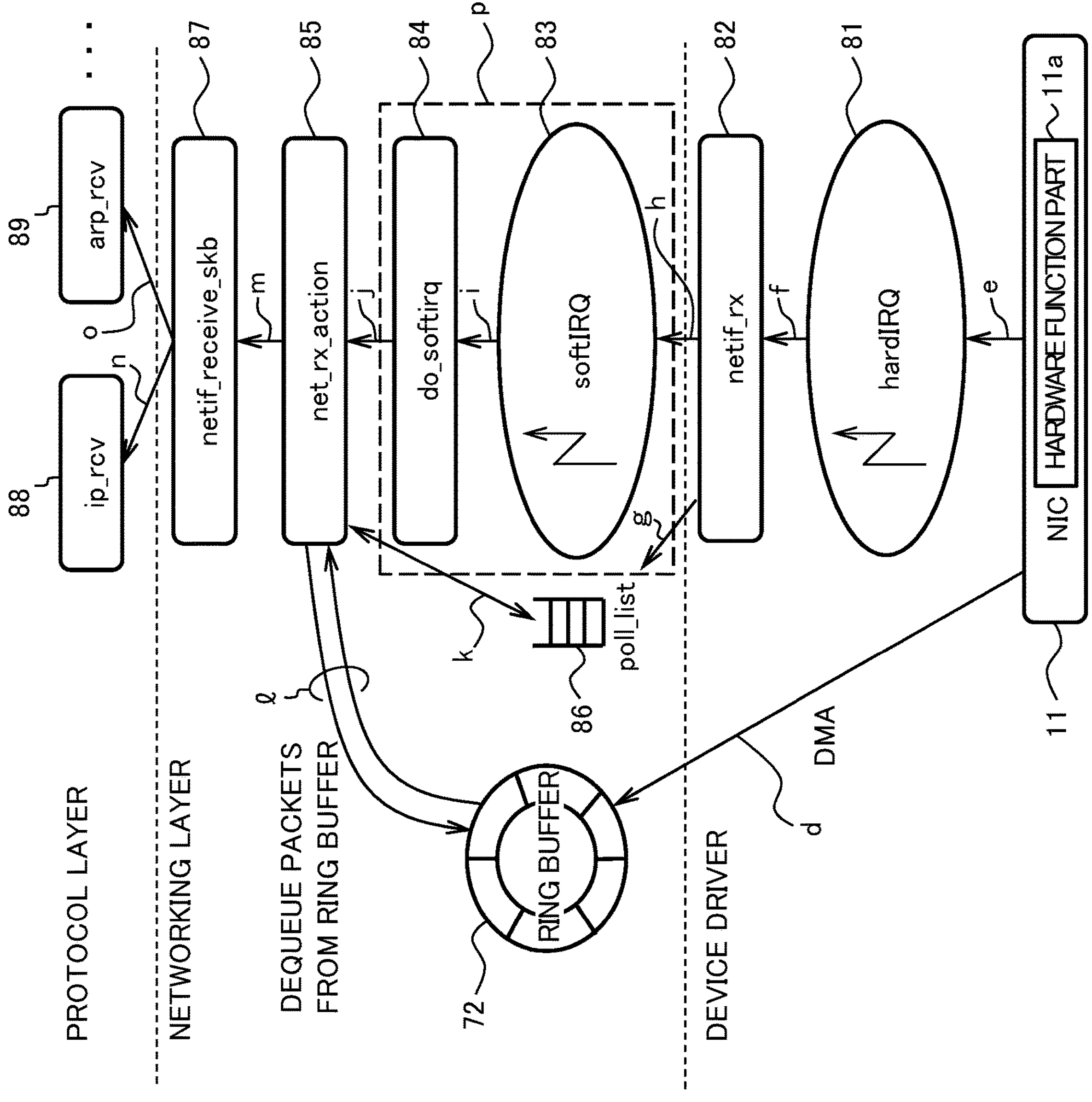
FIG. 12 is an explanatory diagram illustrating an outline of Rx-side packet processing by New API (NAPI) at the part surrounded by the dashed line in FIG. 11.

FIG. 2 is an explanatory diagram illustrating details of Rx-side packet processing by New API (NAPI) of server delay control system 1000 in FIG. 1. The same components as those in FIGS. 1 and 12 are denoted by the same reference signs thereas.

Device Driver

As illustrated in FIG. 2, the components deployed in the device driver include; NIC 11, which is a network interface card; hardIRQ 81, which is a handler called due to the generation of a processing request from NIC 11 to perform the requested processing (hardware interrupt); and netif_rx 182, which is a processing function part for the hardware interrupt.

Networking Layer

The components deployed in the networking layer include: poll_list 186, in which information on a net device (net_device), indicative of which device the hardware interrupt from NIC 11 comes from, is registered; packet arrival monitoring part 110; netif_receive_skb 87, which creates a sk_buff structure for socket communication in which no interrupt occurs, the dequeued packet, wherein sk_buff is a structure for kernel 171 to indicate the state of a packet; and ring buffer 72.

Protocol Layer

The components deployed in the protocol layer include: ip_rcv 88, arp_rcv 89, and the like, which are packet processing function parts. Note that, protocol processing other than ip_rcv 88 and arp_rcv 89 is present.

The above-described netif_rx 182, netif_receive_skb 87, ip_rcv 88, and arp_rcv 89 are program components (function names) called in kernel 171 for packet processing.

Hereinbelow, a description will be given of an operation of server delay control system 1000.

Rx-Side Packet Processing According to Present Invention

The arrows (reference signs) d to g and k to o in FIG. 2 indicate the flow of the Rx-side packet processing.

When NIC 11 receives a packet (or a frame) in the frame from the remote device, NIC 11 copies the arrived packet to ring buffer 72 by a DMA transfer without using the CPU (see reference sign d in FIG. 2). This ring buffer 72 is managed in a memory space in the server by kernel 171 (see FIG. 1).

When a packet arrives, NIC 11 raises a hardware interrupt (hardIRQ) to hardIRQ 81 (handler) (see reference sign e in FIG. 2) and netif_rx 182 performs the processing described below, which causes kernel 171 to notice the packet.

When hardIRQ 81 (handler) has started execution (see reference sign fin FIG. 2), netif_rx 182 stores, into poll_list 186, information of a net device (net_device), which is one piece of information of the content of the hardware interrupt (hardIRQ) and which indicates which device the hardware interrupt from NIC 11 comes from, and registers (see reference sign g in FIG. 2) dequeuing operation information in poll_list 186. Specifically, in response to the packet having been loaded into ring buffer 72, netif_rx 182 registers, in poll_list 186, a dequeuing operation to be performed subsequently, using a driver of NIC 11 (see reference sign g in FIG. 2). As a result, information on the dequeuing operation due to the packet having been loaded into ring buffer 72 is registered into poll_list 186.

Although netif_rx 182 registers net_device in poll_list 186, it does not perform scheduling of a software interrupt (softIRQ), unlike netif_rx 82 illustrated in FIG. 12. That is, netif_rx 182 differs from netif_rx 82 in FIG. 12 in that netif_rx 182 does not perform scheduling of a software interrupt (softIRQ).

In addition, netif_rx 182 cancels the sleep to awake the polling thread in a sleep state (see reference sign p in FIG. 2). This embodiment adds the processing of awaking the polling thread (processing of canceling sleep) to KBP described in Non Patent Literature 3.

With the above-described processing, the hardware interrupt processing in device driver illustrated in FIG. 2 ends.

In the present embodiment, in the networking layer illustrated in FIG. 12, softIRQ 83 and do_softirq 84 are eliminated, and accordingly, netif_rx 82, illustrated in FIG. 12, does not perform communication to raise softIRQ 83 (handler) (see reference sign h in FIG. 12).

In the present embodiment, softIRQ 83 and do_softirq 84, illustrated in FIG. 12, are eliminated in server delay control system 1000, and instead, server delay control device 100 is deployed, in the server, in the memory space of the networking layer, illustrated in FIG. 2.

In the networking layer illustrated in FIG. 2, packet arrival monitoring part 110 of server delay control device 100 monitors (polls) poll_list 186 (see reference sign kin FIG. 2) to check whether a packet has arrived.

Packet arrival monitoring part 110 retrieves pointer information indicative of the presence of a packet in ring buffer 72 and net_device information from poll_list 186 and communicates the information (pointer information and net_device information) to packet dequeuer 120 (see reference sign q in FIG. 2). Here, if multiple pieces of packet information are present in the poll_list 186, information as many as the multiple pieces is communicated.

When a packet has arrived, packet dequeuer 120 of server delay control device 100 dequeues the packet from ring buffer 72 (see reference sign 1 in FIG. 2).

Packet dequeuer 120 retrieves the packet from ring buffer 72 according to the communicated information and communicates the packet to netif_receive_skb 87 (see reference sign m in FIG. 2).

In this way, server delay control system 1000 halts softIRQ of the packet processing which is the main cause of the occurrence of the NW delay, and executes the polling thread, in which packet arrival monitoring part 110 of server delay control device 100 monitors packet arrivals. Then, packet dequeuer 120 performs packet processing according to the polling model (no softIRQ) at the arrivals of packets.

That is, the polling thread in server delay control device 100 operates as a kernel thread and monitors packet arrivals in a polling mode. The packet arrival monitoring part 110 monitors poll_list 186. When a packet arrives, packet dequeuer 120 retrieves the packet from ring buffer 72 and transfers the packet to netif_receive_skb 87.

At the arrival of a packet, the polling thread is awoken by a hardware interrupt handler, so that the softIRQ contention is avoided and packet transfer processing can be immediately performed. In other words, by causing the packet arrival monitoring function to stand by as a kernel thread and to be awoken by a hardware interrupt, it is possible to achieve more reduction of the delay than packet transfer processing through a software interrupt by NAPI or the like.

The kernel thread that monitors packet arrivals is allowed to sleep while there is no packet arrival.

The polling thread sleeps according to whether a packet has arrived and when a packet arrives, the sleep is canceled with hardIRQ 81. Specifically, sleep management part 130 of server delay control device 100 causes the polling thread to sleep according to whether a packet has arrived. That is, sleep management part 130 of server delay control device 100 causes the polling thread to sleep when there is no packet arrival over a certain period of time. Sleep management part 130 cancels the sleep with hardIRQ 81 when a packet arrives. As a result, the softIRQ contention is avoided to achieve reduction of the delay.

CPU frequency/CPU idle setting part 140 of server delay control device 100 changes the CPU operation frequency and/or the idle setting according to whether a packet has arrived. Specifically, CPU frequency/CPU idle setting part 140 lowers the CPU frequency during sleep and raises the CPU frequency when restarting (reverts the CPU operation frequency to its original frequency). CPU frequency/CPU idle setting part 140 also changes the CPU idle setting to a power saving mode when in a sleep state. Power saving is also achieved by, when in a sleep state, changing the CPU operation frequency to a lower frequency and changing the CPU idle setting to a power saving mode.

netif_receive_skb 87 creates a sk_buff structure, analyzes the content of the packet, and assigns processing to the protocol processor 74 arranged in the subsequent stage (see FIG. 11) in a manner depending on the type. That is, netif_receive_skb 87 analyzes the content of the packet and, in the case when processing is to be performed according to the content of the packet, assigns the processing to ip_rcv 88 of the protocol layer, and, for example, in the case of L2, assigns processing to arp_rcv 89.

Figure 3:
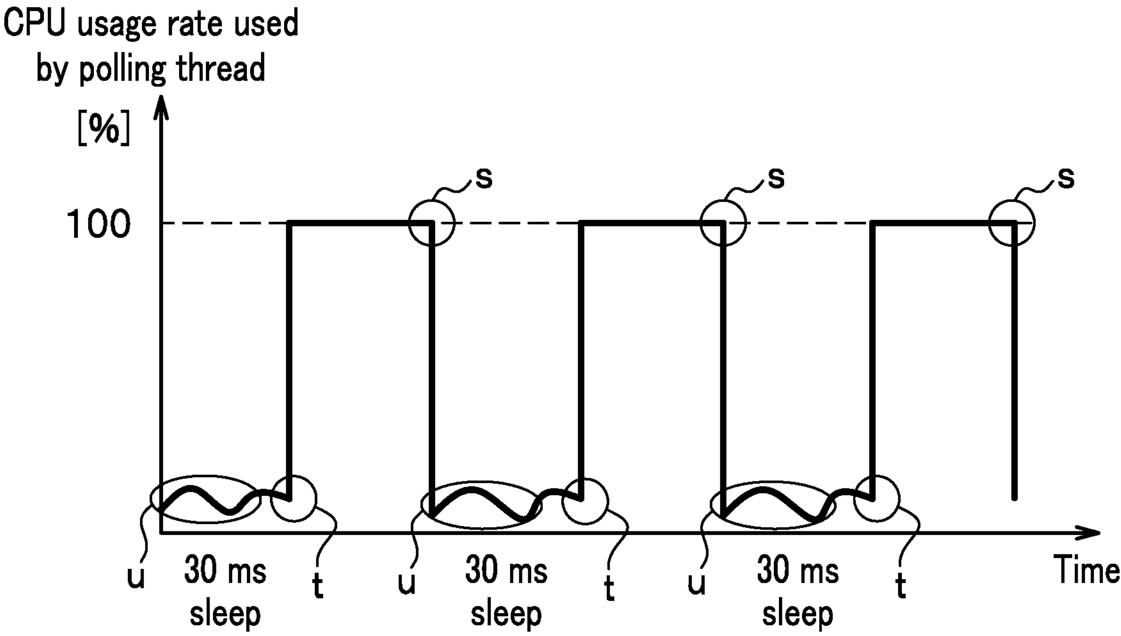
FIG. 3 is a diagram illustrating an example operation of a polling thread of the server delay control system according to the embodiment of the present invention.
Figure 13:
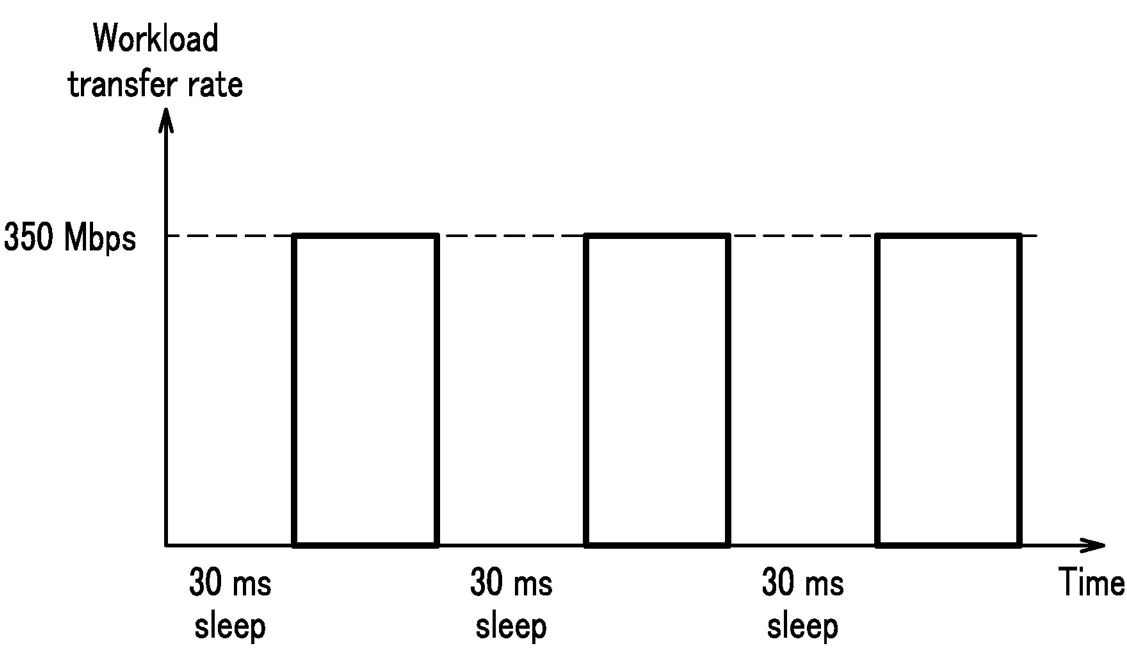
FIG. 13 is a diagram illustrating an example of transfer of video image data (30 FPS).
Figure 14:
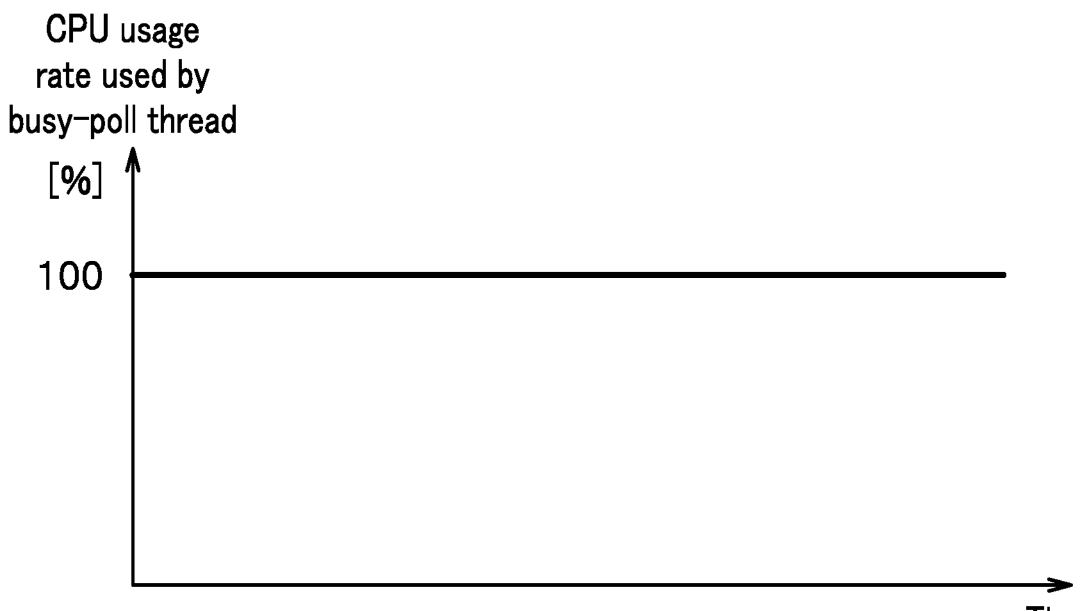
FIG. 14 is a diagram illustrating the CPU usage rate that is used by a busy-poll thread in KBP described in Non Patent Literature 3.

FIG. 3 is a graph illustrating an example of the operation of the polling thread of server delay control device 100. The ordinate axis indicates the CPU usage rate [%] of the CPU core used by the polling thread, and the abscissa axis indicates time. Note that FIG. 3 illustrates an example of polling thread's operation in response to packet arrivals corresponding to the example of the data transfer of the video image data (30 FPS) whose packets are to be intermittently received as illustrated in FIG. 13.

As illustrated in FIG. 3, sleep management part 130 of server delay control device 100 causes the polling thread to sleep (see reference sign s in FIG. 3) when there is no packet arrival over a certain period of time (more specifically, when no successive packet arrives even after a fixed value (a certain period of time) determined beforehand by a maintenance personnel/operator has elapsed since the arrival of a certain packet). Sleep management part 130 starts the polling thread with hardIRQ 81 of a packet arrival (see reference sign tin FIG. 3).

Note that, during sleep, as the kernel thread does not occupy the CPU core, the CPU usage rate of the CPU core used by the polling thread might fluctuate (see reference sign u in FIG. 3) when an interrupt of a timer for stabilizing the system operation enters the CPU core or when a migration thread for performing error processing or the like enters the CPU core, instead of when the polling thread uses the CPU core.

Registration Operation Using Livepatch

Next, a description will be given of a registration operation using Livepatch.

In server delay control system 1000 (see FIG. 1), kernel 171 of OS 70, illustrated in FIG. 1, includes server delay control device 100. Kernel 171 can be embodied without reconstructing (newly building) existing kernel 71 (see FIG. 11), by using Livepatch. Hereinbelow, a description will be given of Livepatch applied to kernel 171.

Livepatch is a kernel patch function to be applied to Linux (registered trade name) kernel. Using Livepatch, it is possible to instantly apply modification to the kernel space without rebooting the system. Specifically, (1) Livepatch suppresses the softIRQ scheduling function of netif_rx 182 (see FIG. 2).

(2) Livepatch starts a thread that monitors packet arrivals (packet arrival monitoring part 110, specifically, isol_net_rx). When the thread (packet arrival monitoring part 110) is started, the thread occupies the CPU core so that the busy polling (see reference sign k in FIG. 2) is not interfered by other processes or kernel threads. To do so, the thread is assigned a high priority setting, such as one for a real-time process. According to the number of traffic flows (or traffic amount), the thread is started on multiple CPU cores and assigned a poll_list 186 to be monitored (see FIG. 2). This allows scaling-out according to the traffic flow (traffic amount).

Thereafter, the operation of the packet processing illustrated in FIG. 2 is performed.

Rx-Side Packet Processing Operation Flow of server delay control device 100

FIG. 4 is a flowchart illustrating Rx-side operations and management processing for power saving by server delay control device 100 (see FIG. 2). The Rx-side operations are described with reference to FIG. 2.

While the polling thread is in a state of having been started, this operation flow is performed in a loop.

In step S1, packet arrival monitoring part 110 (see FIG. 2) of server delay control device 100 monitors (polls) poll_list 186 (see reference sign k in FIG. 2) while occupying the CPU, to check whether a packet has arrived.

In step S2, packet arrival monitoring part 110 (see FIG. 2) determines whether pointer information indicative of a packet arrival is present in poll_list 186.

If pointer information indicative of a packet arrival is present in poll_list 186 (Yes in S2), the flow proceeds to step S3, and if information indicative of a packet arrival is not present in poll_list 186 (No in S2), the flow returns to the processing of step S1.

In step S3, the packet arrival monitoring part 110 retrieves the pointer information indicative of the presence of the packet in ring buffer 72 (see FIG. 2) and NET_DEVICE information from poll_list 186 and communicates the information (pointer information and NET_DEVICE information) to packet dequeuer 120 (see FIG. 2) (see reference sign q in FIG. 2). Here, if multiple pieces of packet information are present in the poll_list 186, information as many as the multiple pieces is communicated.

In step S4, when a packet has arrived, packet dequeuer 120 (see FIG. 2) of server delay control device 100 references the packet held in the ring buffer 72, and performs, on the basis of the processing to be performed next, dequeuing to remove the corresponding queue entry from ring buffer 72 (see reference sign 1 in FIG. 2).

In step S5, packet dequeuer 120 retrieves packet(s) from ring buffer 72 based on the received information and communicates (see reference sign m in FIG. 2) the packet(s) to netif_receive_skb 87.

In step S6, sleep management part 130 of server delay control device 100 determines whether no packet has been stored into the poll_list 186 (whether no packet has arrived) even after a certain period of time has elapsed.

If no packet has been stored into poll_list 186 even after a certain period of time has elapsed (S6: Yes), sleep management part 130 puts the polling thread to sleep (causes the polling thread to sleep) in step S7. If a packet has been stored into poll_list 186 (S6: No), the flow returns to step S1.

In step S8, CPU frequency/CPU idle setting part 140 sets the operation frequency of the CPU core used by the polling thread to a low frequency and terminates the processing of this flow. In a case where CPU frequency/CPU idle setting part 140 is also capable of making a setting of CPU idle, CPU frequency/CPU idle setting part 140 activates idling of CPU.

Figure 5:
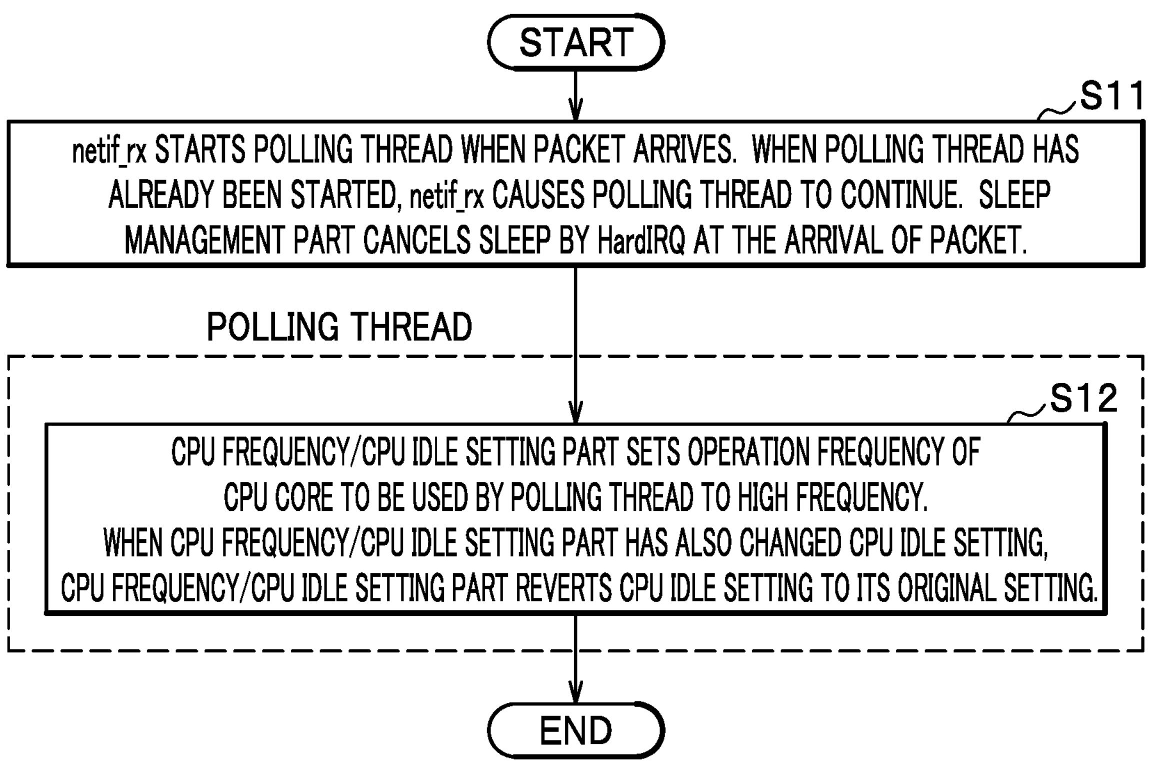
FIG. 5 is a flowchart illustrating CPU frequency/CPU idle setting processing for power saving of the server delay control device of the server delay control system according to the embodiment of the present invention.

FIG. 5 is a flowchart illustrating CPU frequency/CPU idle setting processing for power saving by server delay control device 100.

In step S11, a hardware interrupt processing part (netif_rx 182 in FIG. 2), which is started when a packet arrives, starts the polling thread (server delay control device 100 in FIG. 2) when a packet arrives. If the polling thread has already been started, the polling thread continues. Sleep management part 130 cancels the sleep by the hardIRQ at the arrival of the packet.

In step S12, CPU frequency/CPU idle setting part 140 sets the operation frequency of the CPU core used by the polling thread to a high frequency (reverts the operation frequency of the CPU core to its original frequency) and terminates the processing of this flow. In a case where CPU frequency/CPU idle setting part 140 has also changed the CPU idle setting, CPU frequency/CPU idle setting part 140 reverts the CPU idle setting to its original setting.

Additional Function

To avoid failure of packet dequeueing from poll_list 186, the polling thread may be periodically started to check whether there is a packet arrival in poll_list 186.

In this manner, in a case where there is a timing problem such as simultaneous occurrence of a packet arrival by NIC 11 and sleep of the polling thread, it is possible to prevent a packet from remaining in poll_list 186.

Difference Between Present Embodiment and Existing Technique

Next, a description will be given of differences between the present embodiment and the existing technique (see FIG. 12).

Background

Generally, it is required that a hardware interrupt (hardIRQ) have high priority and the processing of the corresponding CPU be interrupted to process the processing of hardIRQ with the highest priority. For this reason, the overhead is large. In view of this, general design concept for hardIRQ and softIRQ is such that hardIRQ only issues a notification of a packet arrival and a softIRQ processes the packet (this design concept is called "principle of kernel"). Here, there can be an event such that the softIRQ contends with other softIRQs and is put in a wait state. This event is a cause for the occurrence of a delay.

The reason that the conventional technique uses the interrupt model is that conventional technique is based on the design concept such that one CPU core is shared with other processing because the CPU resources are limited in the past (or because the processing is to be performed even in a device with fewer CPU cores as a single board computer like Raspberry Pi). In this case, processing is performed while switching the CPU time in normal processing, interrupt processing, and the like. Even in the above-described interrupt processing, softIRQs contend with one another and thus a wait time occurs.

Further, ksoftirqd, which is a scheduler that schedules softIRQs, does not have a function of imparting a priority according to the type of each softIRQ, and the occurrence of a delay caused by the contention cannot be suppressed.

Existing Technique (See FIG. 12)

As illustrated in FIG. 12, kernel 71 (FIG. 11) receives a notification of a packet arrival from NIC 11 via hardIRQ 81 (see reference sign h in FIG. 12) and schedules softIRQ 83 for packet processing (see the dashed box p in FIG. 12). At this time, a wait occurs when contention with another interrupt processing occurs, and thus an NW delay in the order of milliseconds occurs.

Server Delay Control System 1000 (See FIG. 2)

Implementation of packet arrival monitoring part 110 and packet dequeuer 120

As illustrated in FIG. 2, in the case of server delay control system 1000, although netif_rx 182 registers net_device in poll_list 186 in the networking layer, netif_rx 182 does not perform scheduling of software interrupts (softIRQs) ("modification point 1"), unlike netif_rx 82 in the existing technique (see FIG. 12).

As illustrated in FIG. 2, server delay control system 1000 provides server delay control device 100, in a server memory space, in the networking layer ("modification point 2").

Packet arrival monitoring part 110 of server delay control device 100 constantly monitors (busy-polls) poll_list 186 (see reference sign k in FIG. 2) all the time to check whether a packet has arrived.

Packet arrival monitoring part 110 retrieves pointer information indicative of the presence of a packet in ring buffer 72 and NET_DEVICE information from poll_list 186 and communicates the information (pointer information and net_device information) to packet dequeuer 120 (see reference sign q in FIG. 2).

When a packet has arrived, packet dequeuer 120 of server delay control device 100 dequeues the packet from ring buffer 72 (see reference sign 1 in FIG. 2).

Packet dequeuer 120 retrieves the packet from ring buffer 72 according to the communicated information and communicates the packet to netif_receive_skb 87 (see reference sign m in FIG. 2).

The effects of "modification 1" mentioned above are as follows.

First, this embodiment follows NAPI regarding the notification of a packet arrival using a hardware interrupt (hardIRQ). Although softIRQs are convenient in that they effectively utilize CPU resources, they are not suitable in terms of immediate packet transfer. In view of this, this embodiment is novel in that the embodiment halts the function of the softIRQs and implements the polling model in the kernel. Specifically, this is reflected in that netif_rx 182, illustrated in FIG. 2, does not issue a notification for raising softIRQ 83 (handler) (see reference sign h in FIG. 12) unlike netif_rx 82, illustrated in FIG. 12.

Figure 10:
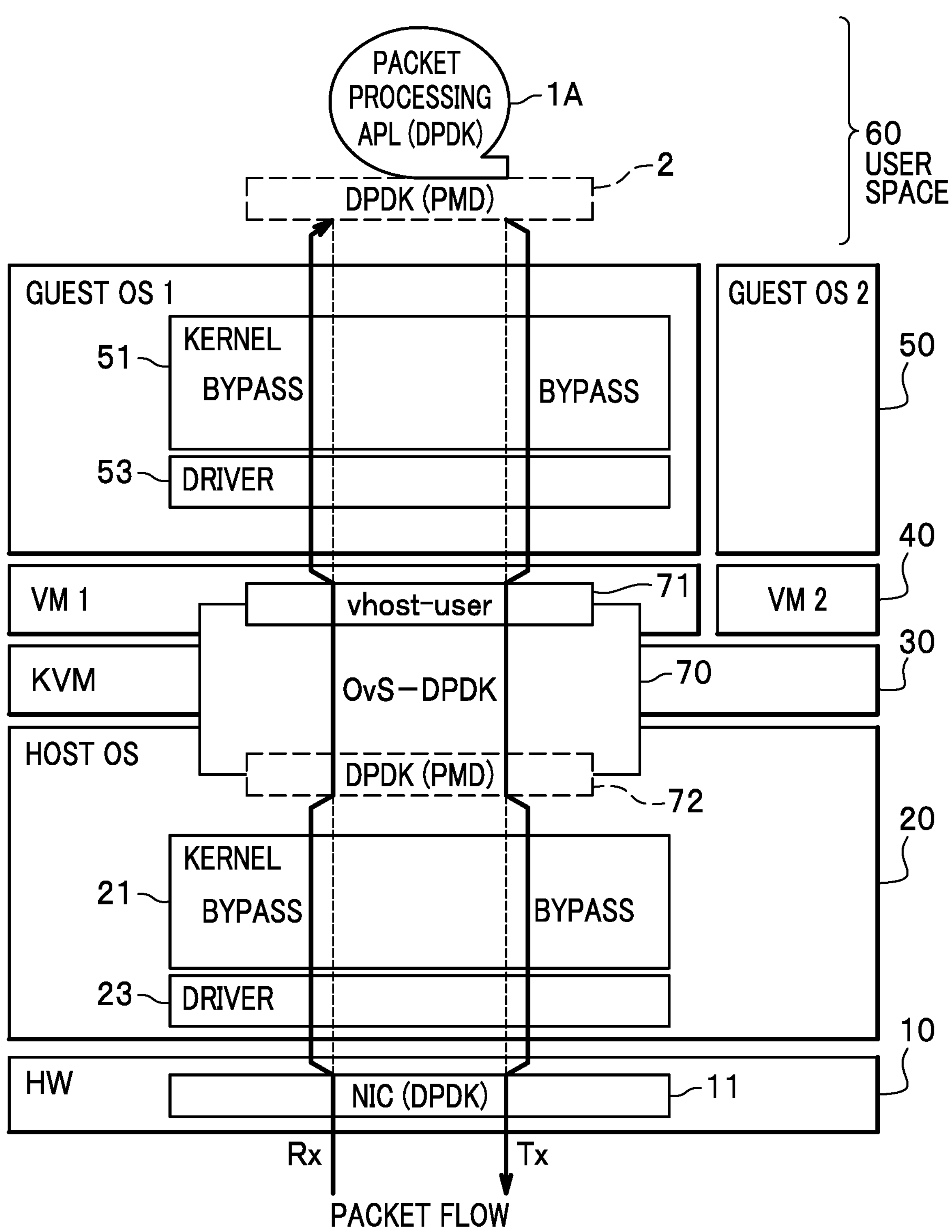
FIG. 10 is an explanatory diagram illustrating packet transfer based on a polling model in an OvS-DPDK configuration.

Note that, with respect to the polling model, DPDK, which performs polling from a user space, is known as an existing technique (see FIG. 10). However, DPDK requires modification of the APL because the polling is to be performed from the APL.

The effects of "modification 2" mentioned above are as follows.

In the present embodiment, a thread (packet arrival monitoring part 110 of server delay control device 100) dedicated to polling is started in kernel 171 illustrated in FIG. 1, and packet dequeuer 120 of server delay control device 100 performs packet processing according to the polling model (no softIRQ) at the arrivals of the packets. This eliminates the need of modifying the APL, and, in other words, makes it possible to use an existing POSIX socket API.

In addition, to prevent the above-described thread from being deprived of a CPU time by other softIRQs or the like, the CPU core is occupied at the time of starting the thread and the thread is given a high priority as described above in "Registration using Livepatch", thereby the polling will not be interfered.

As described above, server delay control device 100 includes the packet arrival monitoring part 110 and the packet dequeuer 120, to achieve low-delay packet transfer. That is, the software interrupt (softIRQ) at the arrivals of the packets is halted, and a polling model is embodied in a kernel. A kernel thread for monitoring packet arrivals is newly created, and packet arrivals in the poll_list 186 are monitored. As the packet is immediately dequeued without a wait at the arrival of the packet, low-delay packet processing can be performed.

Implementation of sleep management part 130 and CPU frequency/CPU idle setting part 140

Server delay control device 100 further includes sleep management part 130 and CPU frequency/CPU idle setting part 140 to save power in addition to performing low-delay packet processing as described above. That is, the kernel thread that monitors packet arrivals may be configured to be made to sleep while there is no packet arrival. The thread in a sleep state is awoken by the hardIRQ handler at the arrivals of packets and thus is immediately started while avoiding softIRQ contentions. The CPU operation frequency and the CPU idle state are controlled corresponding to the sleep to further achieve low power consumption.

Specific Operations of sleep management part 130 and CPU frequency/CPU idle setting part 140 (See FIG. 2)

netif_rx 182 illustrated in FIG. 2 is activated in a case where the polling thread is in a sleep state when a packet arrives (see reference sign p in FIG. 2). In a case where the polling thread has already been started, the hardware interrupt handler is terminated before taking any action in particular.

CPU frequency/CPU idle setting part 140 of the polling thread (server delay control device 100) started by the hardware interrupt handler sets the CPU operation frequency of the CPU core used by the polling thread to a high frequency (reverts the operation frequency of the CPU core to its original frequency).

Here, the kernel can change the operation frequency of the CPU core through governor setting. CPU frequency/CPU idle setting part 140 can set the CPU operation frequency high using governor setting or the like. However, the CPU idle setting depends on the type of the CPU. Note that, in a case where the CPU core has activated the CPU idle setting, the CPU idle setting can be canceled.

Packet arrival monitoring part 110 checks whether a pointer for a packet is stored in poll_list 186. In a case where a pointer is stored, packet arrival monitoring part 110 communicates the pointer information and device driver information to the packet dequeuer 120.

While the polling thread has been started, the polling thread performs the operation described so far in a loop. Further, the packet arrival check intervals in this loop may be made longer or shorter, in a manner depending on the frequency of packet arrivals. For example, the number N of packet arrivals per unit time T is counted, and the frequency of checking is set to N/T [number of times/second] or higher. With this increase or decrease in the intervals, the CPU usage rate can be further reduced.

Packet dequeuer 120 dequeues a packet from ring buffer 72 based on the received pointer information and the device driver information. Thereafter, packet dequeuer 120 communicates the data to netif_receive_skb 87 (packet structure management part) illustrated in FIG. 2.

netif_receive_skb 87 creates a structure (such as a sk_buff structure) necessary for packet processing. Note that the processing to be performed thereafter continues to protocol processing by the kernel.

In the above-described checking poll_list 186 regarding a pointer of a packet, sleep management part 130 receives packet arrival presence/absence information of poll_list 186 from packet arrival monitoring part 110. When determining that there is no packet arrival over a certain period of time based on the packet arrival presence/absence information, sleep management part 130 notifies CPU frequency/CPU idle setting part 140 that there is no packet arrival over the certain period of time.

In cases where there is no packet arrival over the certain period of time, CPU frequency/CPU idle setting part 140 receives a notification from sleep management part 130 and sets the CPU operation frequency of the CPU core used by the polling thread to a low frequency. In cases where the CPU idle setting can be activated at this point of time, CPU frequency/CPU idle setting part 140 activates the CPU idle setting (however, this depends on the type of the CPU).

After completion of the setting by CPU frequency/CPU idle setting part 140, sleep management part 130 puts the polling thread into a sleep state (causes the polling thread to sleep).

Note that the processing of lowering the CPU frequency and the processing of putting the polling thread into a sleep state may be performed simultaneously. In addition, the polling thread may be put to sleep after completion of the packet transfer processing is confirmed.

Hardware Configuration

Figure 6:
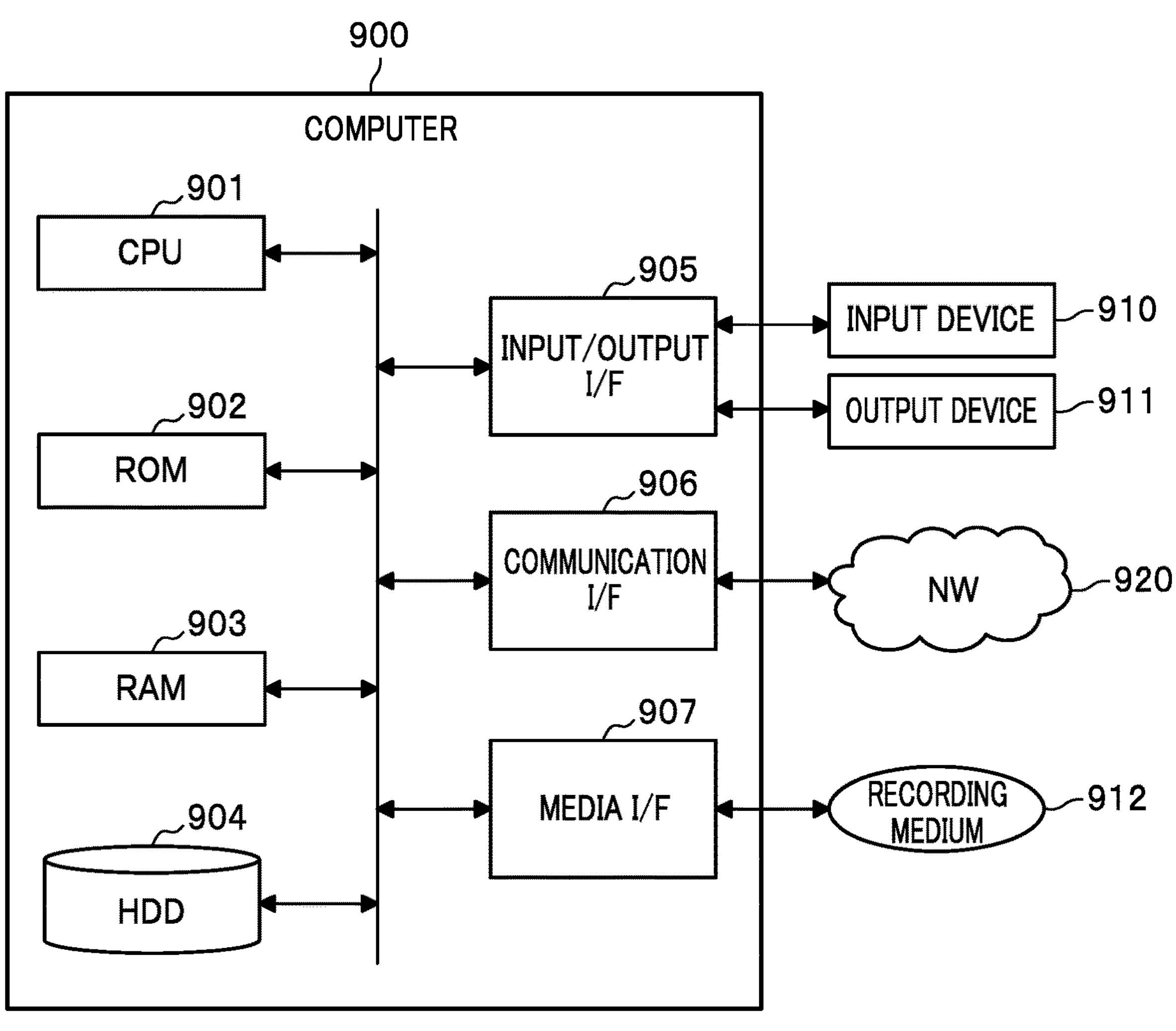
FIG. 6 is a hardware configuration diagram illustrating an example of a computer for embodying the functions of the server delay control device of the server delay control system according to the embodiment of the present invention.

Server delay control device 100 according to the present embodiment is embodied by, for example, a computer 900 having a configuration such as illustrated in FIG. 6.

FIG. 6 is a hardware configuration diagram illustrating an example of computer 900 that embodies the functions of server delay control device 100.

Computer 900 has a CPU 901, a ROM 902, a RAM 903, an HDD 904, a communication interface (I/F: Interface) 906, an input/output interface (I/F) 905, and a media interface (I/F) 907.

CPU 901 operates according to a program stored in ROM 902 or HDD 904, and controls components of server delay control device 100 illustrated in FIG. 1. ROM 902 stores a boot program to be executed by CPU 901 when computer 900 starts up, a program that relies on the hardware of computer 900, and the like.

CPU 901 controls an input device 910 such as a mouse and a keyboard and an output device 911 such as a display via an input/output I/F 905. CPU 901 acquires data from an input device 910 via input/output I/F 905, and outputs generated data to output device 911. A GPU (Graphics Processing Unit) or the like may be used together with CPU 901 as a processor.

HDD 904 stores programs to be executed by CPU 901, data to be used by the programs, and the like. Communication interface 906 receives data from another device via a communication network (e.g., network (NW) 920), sends the received data to CPU 901, and transmits data generated by CPU 901 to another device via the communication network.

Media I/F 907 reads a program or data stored in a recording medium 912 and provides the read program or data to CPU 901 via RAM 903. The CPU 901 loads a program related to target processing from the recording medium 912 onto RAM 903 via media I/F 907 and executes the loaded program. Recording medium 912 is an optical recording medium such as a digital versatile disc (DVD) or a phase change rewritable disk (PD), a magneto-optical recording medium such as a magneto-optical disk (MO), a magnetic recording medium, a conductor memory tape medium, a semiconductor memory, or the like.

For example, when computer 900 functions as server delay control device 100 configured as one device according to the present embodiment, CPU 901 of computer 900 embodies the functions of server delay control device 100 by executing the program loaded on RAM 903. Data in RAM 903 are stored in HDD 904. CPU 901 reads a program related to target processing from recording medium 912 and executes it. In addition, CPU 901 may read a program related to target processing from another device via a communication network (NW 920).

Application Example

Server delay control device 100 is to be a server delay control device that spawns in the kernel a thread that monitors packet arrivals according to the polling model. There is no limitation to the OS. Also, there is no limitation to being in a server virtualization environment. Accordingly, server delay control system 1000 can be applied to each of the configurations illustrated in FIGS. 7 and 8.

Example of Application to VM Configuration

Figure 7:
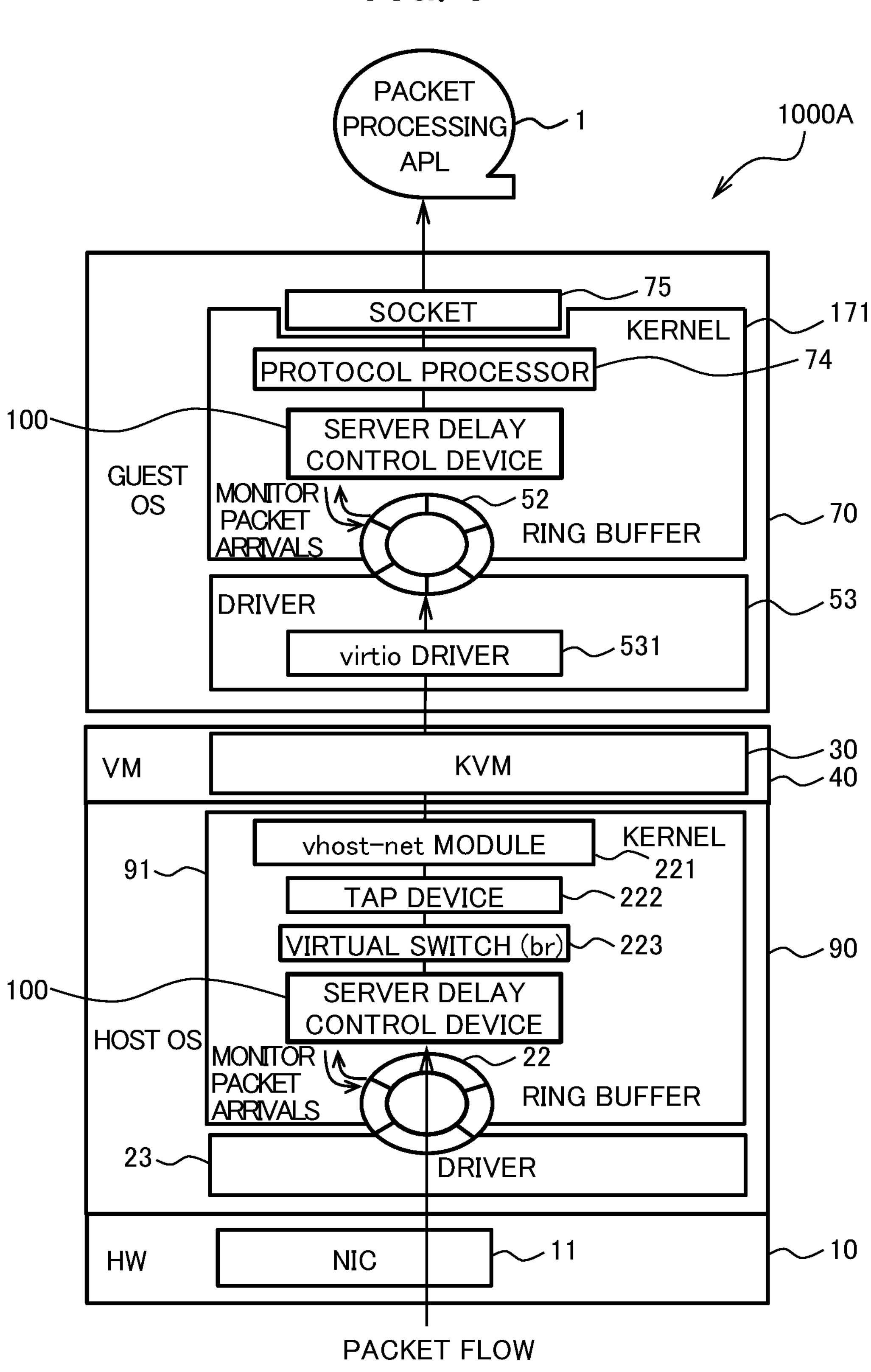
FIG. 7 is a diagram illustrating an example in which the server delay control system is applied to an interrupt model in a server virtualization environment which is configured with a general-purpose Linux kernel and a VM.
Figure 9:
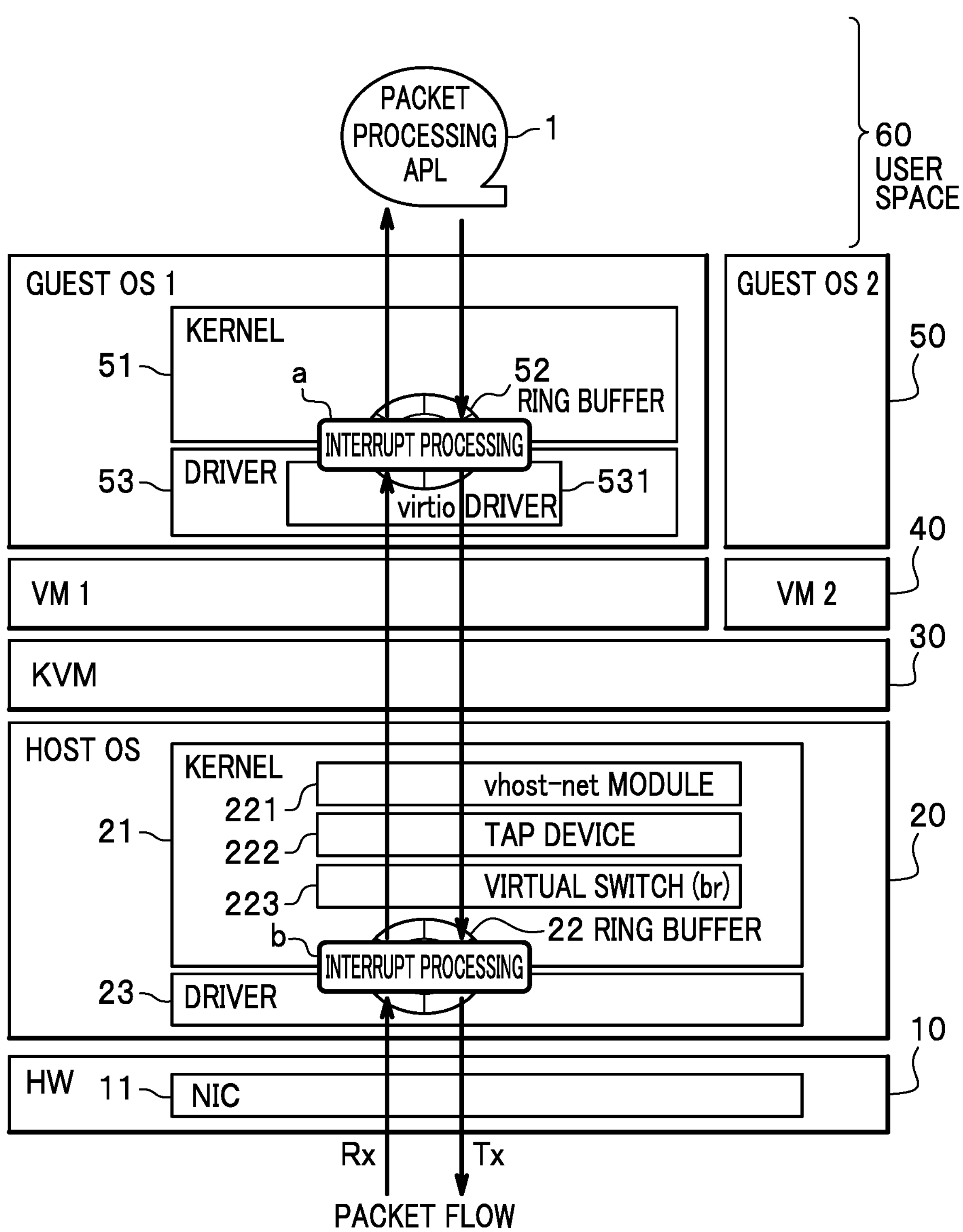
FIG. 9 is an explanatory diagram illustrating packet transfer operations performed according to an interrupt model in a server virtualization environment which is configured with a general-purpose Linux kernel and a VM.

FIG. 7 is a diagram illustrating an example in which a server delay control system 1000A is applied to the interrupt model in a server virtualization environment which is configured with a general-purpose Linux kernel (registered trade name) and a VM. The same components as those in FIGS. 1 and 9 are denoted by the same reference signs thereas.

As illustrated in FIG. 7, server delay control system 1000A is such that a server delay control device 100 is deployed in a kernel 171 of a Guest OS 70 and another server delay control device 100 is deployed in a kernel 91 of a Host OS 90.

In detail, the server includes Host OS 90, on which a virtual machine and an external process formed outside the virtual machine can operate; and Guest OS 70, which operates in the virtual machine.

Host OS 90 includes: kernel 91; a ring buffer 22 that is managed by kernel 91, in a memory space in which the server deploys Host OS 90, and a poll_list 186 (see FIG. 2), in which information on net device, indicative of which device the hardware interrupt (hardIRQ) from a NIC 11 comes from, is registered; a vhost-net module 221, which is a kernel thread; a TAP device 222, which is a virtual interface created by kernel 91; and a virtual switch (br) 223.

Kernel 91 includes a server delay control device 100.

Kernel 91 transmits packets to a virtual machine 30 via TAP device 222.

On the other hand, Guest OS 70 includes: kernel 171; a ring buffer 52 that is managed by kernel 171, in a memory space in which the server deploys Guest OS 70; a poll_list 186 (see FIG. 2), in which information on net device, indicative of which device the hardware interrupt (hardIRQ) from NIC 11 comes from, is registered; a socket 75, which is an interface for kernel 171 to perform inter-process communication.

Kernel 171 includes: a server delay control device 100, a protocol processor 74 configured to perform protocol processing on the packet on which the dequeuing is performed.

Kernel 171 communicates the packets to a packet processing APL 1 via protocol processor 74.

In this way, in a system with a VM virtual server configuration, packet transfer can be performed with reduced delays in the server without modifying the APL in any OS of Host OS 90 and Guest OS 70.

Example of Application to Container Configuration

Figure 8:
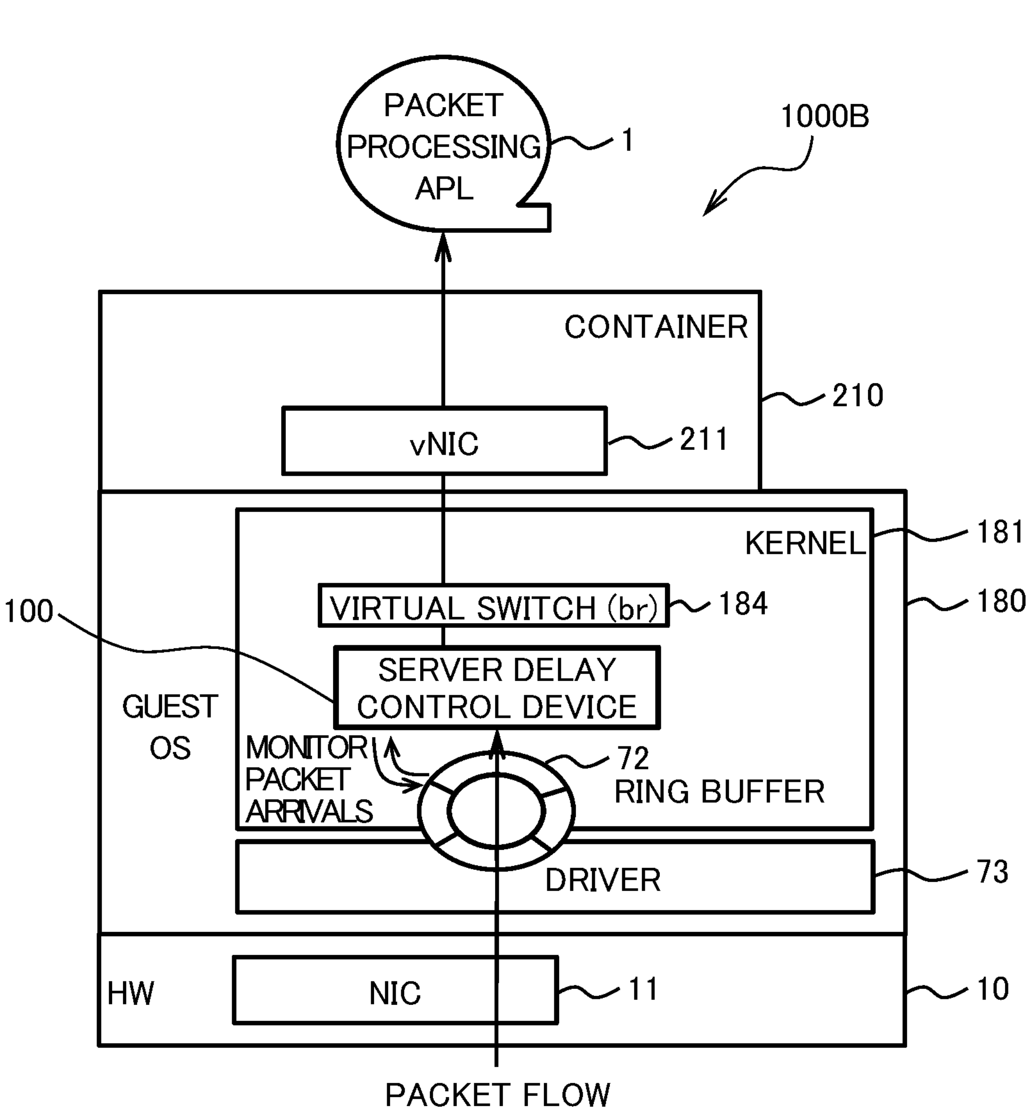
FIG. 8 is a diagram illustrating an example in which the server delay control system is applied to an interrupt model in a server virtualization environment having a container configuration.

FIG. 8 is a diagram illustrating an example in which a server delay control system 1000B is applied to an interrupt model in a server virtualization environment with a container configuration. The same components as those in FIG. 1 are denoted by the same reference signs thereas.

As illustrated in FIG. 8, server delay control system 1000B has a container configuration in which a Guest OS 180 and, in place of an OS, a Container 210 are deployed. Container 210 includes a vNIC (virtual NIC) 211. A server delay control device 100 is deployed in a kernel 181 of Guest OS 180.

In the system with the virtual server configuration, such as a container, packet transfer can be performed with a reduced delay in the server without modifying the APL.

Example of Application to Bare-Metal Configuration (Non-Virtualized Configuration)

The present invention can be applied to a system with a non-virtualized configuration, such as in a bare-metal configuration. In a non-virtualized configuration system, packet transfer can be performed with a reduced delay in a server without modifying an APL 3.

Extended Technique

The present invention makes it possible to scale out against a network load by increasing the number of CPUs allocated to a packet arrival monitoring thread in conjunction with receive-side scaling (RSS), which is capable of processing inbound network traffic with multiple CPUs when the number of traffic flows increases. Thus, scaling out with respect to the network load becomes possible.

Effects

As described above, an OS (OS 70) includes: a kernel (kernel 171); a ring buffer (ring buffer 72) managed by the kernel, in a memory space in which a server deploys the OS; and a poll list (poll list 186), in which information on net device, indicative of which device a hardware interrupt (hardIRQ) from an interface part (NIC 11) comes from, is registered. The kernel includes a server delay control device (server delay control device 100) configured to spawn a thread that monitors packet arrivals according to a polling model. The server delay control device includes: a packet arrival monitoring part (packet arrival monitoring part 110) configured to monitor (poll) the poll list; and a packet dequeuer (packet dequeuer 120) configured to, when a packet has arrived, reference the packet held in the ring buffer, and perform, on the basis of the processing to be performed next, dequeuing to remove the corresponding queue entry from the ring buffer, and a sleep management part (sleep management part 130) configured to, when there is no packet arrival over a predetermined period of time, cause a thread (polling thread) to sleep and, when a packet arrives, cancel the sleep by a hardware interrupt (hardIRQ) of the thread (polling thread).

In this way, server delay control device 100 halts the software interrupts (softIRQs) that perform packet processing, which is the main cause of the occurrence of the NW delay, and executes a thread in which packet arrival monitoring part 110 of server delay control device 100 monitors packet arrivals; and packet dequeuer 120 performs packet processing according to the polling model (no softIRQ) at the arrivals of packets. In a case where there is no packet arrival over a predetermined period of time, sleep management part 130 causes the thread (polling thread) to sleep, so that the thread (polling thread) is in a sleep state while no packet is arriving. Sleep management part 130 cancels the sleep by a hardware interrupt (hardIRQ) when a packet arrives.

As a result, the following effects of (1) to (4) are provided.

(1) Software interrupts (softIRQs) at the arrivals of packets, which are the cause of the occurrence of a delay, are halted and the polling model is embodied in the kernel (kernel 171). That is, server delay control system 1000 embodies the polling model rather than the interrupt model, which is the main cause of the NW delay, unlike NAPI of the existing technique. As the packet is immediately dequeued without a wait at the arrival of the packet, low-delay packet processing can be performed.

(2) The polling thread in server delay control device 100 operates as a kernel thread and monitors packet arrivals in a polling mode. The kernel thread (polling thread) that monitors packet arrivals sleeps while there is no packet arrival. In a case where there is no packet arrival, as the CPU is not used due to the sleep, an effect of power saving can be obtained.

When a packet arrives, the polling thread in a sleep state is awoken (sleep is canceled) by the hardIRQ handler at the arrival of the packet. As the sleep is canceled by the hardIRQ handler, the polling thread can be promptly started while avoiding softIRQ contentions. Here, the cancelation of sleep is characterized in that the sleep is not canceled a timer that is provided therein, but by the hardIRQ handler. Note that, in a case where the traffic load is known in advance, such as a case where 30 ms sleep is known like the workload transfer rate illustrated in FIG. 13, the polling thread may be awoken by the hardIRQ handler at this timing.

As described above, server delay control device 100 can achieve both low delay and power saving by performing sleep management on the polling thread that performs packet transfer processing.

(3) There is no need of having an APL equipped with a function for high-speed packet transfer, and the APL is simply to interwork with the existing POSIX socket API of the kernel (kernel 171). That is, unlike DPDK of the existing technique, server delay control system 1000 does not require the APL to be modified because the polling model is embodied in the kernel. Specifically, there is no need of implementing the function for high-speed packet transfer (see dpdk (PMD) 2 in FIG. 10) in packet processing APL 1A (see FIG. 10) as illustrated in FIG. 10. Packet processing APL 1 (see FIG. 1) of server delay control system 1000 is simply to interwork with the existing POSIX socket API in the kernel (without any modification to the protocol stack of the kernel). Therefore, the implementation is possible without modifying the APL.

(4) For the same reason as above, the kernel can be implemented without the need of creating a proprietary kernel.

Moreover, a Guest OS (Guest OS 70) configured to operate in a virtual machine includes: a kernel (kernel 171); a ring buffer (ring buffer 72) managed by the kernel, in a memory space in which the server deploys the guest OS; a poll list (poll list 186), in which information on a net device, indicative of which device a hardware interrupt (hardIRQ) from an interface part (NIC 11) comes from, is registered; and a protocol processor (protocol processor 74) configured to perform protocol processing on a packet on which dequeuing has been performed. The kernel includes a server delay control device (server delay control device 100) configured to spawn a thread that monitors packet arrivals according to a polling model. The server delay control device includes: a packet arrival monitoring part (packet arrival monitoring part 110) configured to monitor (poll) the poll list; a packet dequeuer (packet dequeuer 120) configured to, when a packet has arrived, reference the packet held in the ring buffer, and perform, on the basis of the processing to be performed next, dequeuing to remove the corresponding queue entry from the ring buffer; and a sleep management part (sleep management part 130) configured to, when there is no packet arrival over a predetermined period of time, cause a thread (polling thread) to sleep and, when a packet arrives, cancel the sleep by a hardware interrupt (hardIRQ) of the thread.

In this way, in a system with a VM virtual server configuration, packet transfer can be performed with reduced delays in the server including the guest OS (guest OS 70) without modifying the APL, while reducing the power consumption.

Moreover, a Host OS (Host OS 90) on which a virtual machine and an external process formed outside the virtual machine can operate includes: a kernel (kernel 91); a ring buffer (ring buffer 22) managed by the kernel, in a memory space in which the server deploys the Host OS; a poll list (poll list 186) in which information on net device, indicative of which device a hardware interrupt (hardIRQ) from an interface part (NIC 11) comes from, is registered; and a TAP device (TAP device 222), which is a virtual interface created by the kernel (kernel 91). The kernel includes a server delay control device (server delay control device 100) configured to spawn a thread that monitors packet arrivals according to a polling model. The server delay control device includes: a packet arrival monitoring part (packet arrival monitoring part 110) configured to monitor (poll) the poll list; a packet dequeuer (packet dequeuer 120) configured to, when a packet has arrived, reference the packet held in the ring buffer (ring buffer 72), and perform, on the basis of the processing to be performed next, dequeuing to remove the corresponding queue entry from the ring buffer; and a sleep management part (sleep management part 130) configured to, when there is no packet arrival over a predetermined period of time, cause a thread (polling thread) to sleep and, when a packet arrives, cancel the sleep by a hardware interrupt (hardIRQ) of the thread.

In this way, in a system with a VM virtual server configuration, packet transfer can be performed with reduced delays in the server including the kernel (kernel 171) and the host OS (host OS 90) without modifying the APL, while reducing the power consumption.

Server delay control device (server delay control device 100) is characterized in that the server delay control device include a CPU frequency setting part (CPU frequency/CPU idle setting part 140) that sets the CPU operation frequency of a CPU core used by the thread to a low frequency during the sleep.

In this way, the server delay control device 100 dynamically changes the CPU operation frequency according to the traffic, i.e., sets the CPU operation frequency to a low frequency if the CPU is not used due to the sleep, so that the power saving effect can be further enhanced.

Server delay control device (server delay control device 100) is characterized in that the server delay control device includes a CPU idle setting part (CPU frequency/CPU idle setting part 140) that sets the CPU idle state of the CPU core used by the thread during sleep to a power-saving mode.

In this way, the server delay control device 100 dynamically changes the CPU idle state (function of power saving based on the type of CPU, such as function of changing the operating voltage) according to the traffic, so that the power saving effect can be further enhanced.

Server delay control device (server delay control device 100) is characterized in that the kernel (kernel 171) includes a patch (Livepatch) that is capable of changing the processing operations of the kernel while running the kernel in a state of having been started.

With this configuration, in the case of server delay control device 100, there is no need of modifying the kernel (kernel 171) because the processing operation of the kernel can be changed using Livepatch. Therefore, in the case of server delay control device 100, there is no need of re-developing the kernel, for example, at every security update of the kernel. The processing operations need to be modified only when there is a change in the related kernel functions.

Note that among the processes described in the above embodiments, all or some of the processes described as being automatically performed can also be manually performed, or all or some of the processes described as being manually performed can also be performed automatically using a known method. Also, the processing procedure, the control procedure, specific names, and information including various types of data and parameters, which have been described in the above-presented description and drawings can be changed as appropriate unless otherwise specified.

Also, each constituent element of the illustrated devices is a functional concept, and does not necessarily need to be physically configured as illustrated in the drawings. That is, the specific forms of the distribution and integration of the devices are not limited to those illustrated in the drawings, and all or some of the specific forms can be functionally or physically distributed or integrated in any unit according to various types of loads, usage conditions, and the like.

Also, the above configurations, functions, processing parts, processing means, and the like may be embodied by hardware by designing a part or all of them with, for example, an integrated circuit, or the like. Also, each of the above configurations, functions, and the like may be embodied by software for the processor to interpret and execute a program for realizing each function. Information such as programs, tables, and files that embody each function can be stored in a memory, a recording device such as a hard disk, or an SSD (Solid State Drive), or a recording medium such as an IC (Integrated Circuit) card, an SD (Secure Digital) card, or an optical disk.

REFERENCE SIGNS LIST

1 Packet processing APL (application)
10 HW
11 NIC (physical NIC) (interface part)
70 OS
74 Protocol processor
60 User space
72 Ring buffer
90 Host OS (OS)
91, 171, 181 Kernel
100 Server delay control device (polling thread)
110 Packet arrival monitoring part
120 Packet dequeuer
130 Sleep management part
140 CPU frequency/CPU idle setting part (CPU frequency setting part, CPU idle setting Part)
180 Guest OS (OS)
186 Poll list (poll list)
210 Container
1000, 1000A, 1000B Server delay control system

The invention claimed is:

1. A server delay control device for performing, on a server deployed on a computer comprising one or more hardware processors, packet transfer from an interface part of the computer, the server comprising an OS and implemented using one or more of the one or more hardware processors, the OS comprising: a kernel in which the server delay control device is deployed; a ring buffer managed by the kernel, in a memory space in which the server deploys the OS; and a poll list in which information on a net device is registered, the information on the net device being indicative of which device a hardware interrupt from an interface part comes from, the server delay control device implemented using one or more of the one or more hardware processors and comprising:

a packet arrival monitoring part configured to run in the kernel as a thread that monitors the poll list repeatedly in a loop to monitor a packet arrival according to a polling model, independently of an application executed on the OS;

a packet dequeuer configured to, when a packet has arrived, reference the packet held in the ring buffer, and perform dequeuing to remove a corresponding queue entry from the ring buffer, independently of an application executed on the OS without software interrupts; and a sleep management part configured to, when there is no packet arrival over a predetermined period of time during which the thread monitors the poll list to monitor the packet arrival according to the polling model, cause the thread to sleep independently of an application executed on the OS without software interrupts and, when a packet arrives, cancel the sleep of the thread by a hardware interrupt handler.

2. The server delay control device according to claim 1, wherein the server comprises a virtual machine and the OS is a Guest OS configured to operate in the virtual machine.

3. The server delay control device according to claim 1, wherein the OS is a Host OS on which a virtual machine and an external process formed outside the virtual machine can operate.

4. The server delay control device according to claim 1, wherein the server delay control device further comprises a CPU frequency setting part configured to set, in the sleep, a CPU operation frequency of a CPU core used by the thread to a low frequency.

5. The server delay control device according to claim 2, wherein the server delay control device further comprises a CPU frequency setting part configured to set, in the sleep, a CPU operation frequency of a CPU core used by the thread to a low frequency.

6. The server delay control device according to claim 3, wherein the server delay control device further comprises a CPU frequency setting part configured to set, in the sleep, a CPU operation frequency of a CPU core used by the thread to a low frequency.

7. The server delay control device according to claim 1, wherein the server delay control device further comprises a CPU idle setting part configured to set, during the sleep, a CPU idle state of a CPU core used by the thread to a power-saving mode.

8. The server delay control device according to claim 2, wherein the server delay control device further comprises a CPU idle setting part configured to set, during the sleep, a CPU idle state of a CPU core used by the thread to a power-saving mode.

9. The server delay control device according to claim 3, wherein the server delay control device further comprises a CPU idle setting part configured to set, during the sleep, a CPU idle state of a CPU core used by the thread to a power-saving mode.

10. The server delay control device according to claim 1, wherein the kernel further comprises a patch that is capable of changing a processing operation of the kernel while running the kernel in a state of having been started.

11. The server delay control device according to claim 2, wherein the kernel further comprises a patch that is capable of changing a processing operation of the kernel while running the kernel in a state of having been started.

12. The server delay control device according to claim 3, wherein the kernel further comprises a patch that is capable of changing a processing operation of the kernel while running the kernel in a state of having been started.

13. A server delay control method of a server delay control device for performing, on a server deployed on a computer comprising one or more hardware processors, packet transfer from an interface part of the computer, the server comprising an OS and implemented using one or more of the one or more hardware processors, the server delay control device implemented using one or more of the one or more hardware processors, the OS comprising: a kernel in which the server delay control device is deployed; a ring buffer managed by the kernel, in a memory space in which the server deploys the OS; and a poll list in which information on a net device is registered, the information on the net device being indicative of which device a hardware interrupt from an interface part comes from, the server delay control method comprising steps of:

monitoring, by a thread spawned in the kernel by the server delay control device, the poll list repeatedly in a loop to monitor a packet arrival according to a polling model, independently of an application executed on the OS;

when a packet has arrived, referencing, by the server delay control device, the packet held in the ring buffer, and performing, by the server delay control device, dequeuing to remove a corresponding queue entry from the ring buffer, independently of an application executed on the OS without software interrupts; and when there is no packet arrival over a predetermined period of time during which the thread monitors the poll list to monitor the packet arrival according to the polling model, causing, by the server delay control device, the thread to sleep independently of an application executed on the OS without software interrupts and, when a packet arrives, canceling, by a hardware interrupt handler implemented in the server delay control device, the sleep of the thread.

14. A non-transitory computer-readable medium storing a computer program for a server delay control device for performing, on a server deployed on a computer comprising one or more hardware processors, packet transfer from an interface part of the computer, the server comprising an OS and implemented using one or more of the one or more hardware processors, the server delay control device implemented using one or more of the one or more hardware processors, the OS comprising: a kernel in which the server delay control device is deployed; a ring buffer managed by the kernel, in a memory space in which the server deploys the OS; and a poll list in which information on a net device is registered, the information on the net device being indicative of which device a hardware interrupt from an interface part comes from, the computer program causing the server delay control device to execute steps comprising:

monitoring, by a thread spawned in the kernel by the server delay control device, the poll list repeatedly in a loop to monitor a packet arrival according to a polling model, independently of an application executed on the OS;

when a packet has arrived, referencing, by the server delay control device, the packet held in the ring buffer, and performing, by the server delay control device, dequeuing to remove a corresponding queue entry from the ring buffer, independently of an application executed on the OS without software interrupts; and when there is no packet arrival over a predetermined period of time during which the thread monitors the poll list to monitor the packet arrival according to the polling model, causing, by the server delay control device, the thread to sleep independently of an application executed on the OS without software interrupts and, when a packet arrives, canceling, by a hardware interrupt handler implemented in the server delay control device, the sleep of the thread.

15. The server delay control device according to claim 1, the sleep management part is configured to, when no successive packet arrives after the predetermined period of time has elapsed since an arrival of a certain packet, cause the thread to sleep and, when a packet arrives, cancel the sleep of the thread by a hardware interrupt handler.

16. The server delay control method according to claim 13, wherein the step of causing the thread to sleep is performed when no successive packet arrives after the predetermined period of time has elapsed since an arrival of a certain packet.

17. The non-transitory computer-readable medium according to claim 14, wherein the step of causing the thread to sleep is performed when no successive packet arrives after the predetermined period of time has elapsed since an arrival of a certain packet.

* * * * *